(12) United States Patent
Zhou et al.

(10) Patent No.: US 12,483,298 B2
(45) Date of Patent: Nov. 25, 2025

(54) COMMUNICATION DEVICE AND ELECTRONIC DEVICE

(71) Applicant: Huawei Technologies Co., Ltd., Shenzhen (CN)

(72) Inventors: Mu Zhou, Shanghai (CN); Chenghao Wang, Shenzhen (CN); Minqiu Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 18/344,297

(22) Filed: Jun. 29, 2023

(65) Prior Publication Data

US 2023/0344471 A1 Oct. 26, 2023

Related U.S. Application Data

(63) Continuation of application No. PCT/CN2020/142086, filed on Dec. 31, 2020.

(51) Int. Cl.
*H04B 7/0413* (2017.01)

(52) U.S. Cl.
CPC .................. *H04B 7/0413* (2013.01)

(58) Field of Classification Search
CPC ...... H04B 7/04; H04B 7/0413; H04B 7/0408; H04B 7/0404; H04B 15/00; H04B 7/0456; H04B 7/0482; H04B 7/06; H04B 7/0602; H04B 7/0604; H04B 7/0608; H04B 7/061
See application file for complete search history.

(56) References Cited

U.S. PATENT DOCUMENTS

| | | | |
|---|---|---|---|
| 10,425,143 B2* | 9/2019 | Friedman | H04B 7/0686 |
| 2008/0240031 A1* | 10/2008 | Nassiri-Toussi | H04B 7/0848 370/329 |
| 2013/0202054 A1 | 8/2013 | Khan et al. | |
| 2018/0088221 A1* | 3/2018 | Yomo | G01S 7/003 |
| 2020/0195327 A1 | 6/2020 | Thiagarajan et al. | |
| 2020/0292663 A1 | 9/2020 | Bai et al. | |
| 2021/0067118 A1* | 3/2021 | Patel | H01Q 21/0025 |
| 2021/0099205 A1* | 4/2021 | Seyed | H04B 7/0805 |

FOREIGN PATENT DOCUMENTS

| | | |
|---|---|---|
| CN | 106252887 A | 12/2016 |
| CN | 106767162 A | 5/2017 |
| CN | 109039394 A | 12/2018 |
| CN | 112015225 A | 12/2020 |
| WO | 2016078565 A1 | 5/2016 |

* cited by examiner

*Primary Examiner* — Khanh C Tran
(74) *Attorney, Agent, or Firm* — Slater Matsil, LLP

(57) ABSTRACT

Embodiments of this application provide a communication device. The communication device includes a first splitter, a first transmit path, and a second transmit path, where the first transmit path includes a first phase shifter and a first power amplifier, and the second transmit path includes a second phase shifter and a second power amplifier; an output end of the first transmit path is coupled to a first transmit antenna, and an output end of the second transmit path is coupled to a second transmit antenna; an input end of the first transmit path and an input end of the second transmit path are separately coupled to the splitter; the first transmit path and the second transmit path are configured to transmit a beamforming signal; and the first transmit path and the second transmit path are further configured to transmit a multiple-input-multiple-output MIMO signal.

20 Claims, 16 Drawing Sheets

(a)

(b)

COMMUNICATION DEVICE AND ELECTRONIC DEVICE

CROSS-REFERENCE TO RELATED APPLICATIONS

This application is a continuation of International Application No. PCT/CN2020/142086, filed on Dec. 31, 2020, the disclosure of which is hereby incorporated by reference in its entirety.

TECHNICAL FIELD

Embodiments of this application relate to the field of radio frequency circuit technologies, and in particular, to a communication device and an electronic device.

BACKGROUND

With development of science and technology, communication technology has been promoted rapidly. Based on different scenarios, different receiving and sending manners usually need to be adopted to implement receiving and sending of a communication signal. For example, in a scenario in which a lateral space coverage area is large, or in a scenario in which a forward space coverage area is large, a signal usually needs to be received and sent in different manners.

A receiving and sending manner of a conventional signal is single. Therefore, how to flexibly configure the signal receiving and sending manner to meet requirements of different receiving and sending scenarios becomes a problem that needs to be resolved.

SUMMARY

According to the communication device and the electronic device provided in this application, a manner of receiving and sending a signal may be flexibly configured.

To achieve the foregoing objectives, the following technical solutions are used in this application.

According to a first aspect, an embodiment of this application provides a communication device, where the communication device includes: a splitter, a first transmit path, and a second transmit path, where the first transmit path includes a first phase shifter and a first power amplifier, and the second transmit path includes a second phase shifter and a second power amplifier; an output end of the first transmit path is coupled to a first transmit antenna, and an output end of the second transmit path is coupled to a second transmit antenna; an input end of the first transmit path and an input end of the second transmit path are separately coupled to the splitter; the first transmit path and the second transmit path are configured to transmit a beamforming signal; and the first transmit path and the second transmit path are further configured to transmit a multiple-input-multiple-output MIMO signal.

In this application, the first transmit path and the second transmit path are configured to transmit both a beamforming (BF) signal and a multiple-input-multiple-output (MIMO) signal, so that the communication device can flexibly configure a manner of receiving and sending a signal based on a requirement of a signal receiving and sending scenario. For example, in a vehicle-mounted radar scenario, when the vehicle needs to scan a range with a wide transverse area, the communication device 10 may transmit a signal in a MIMO mode; and when the vehicle needs to cover a large forward space, the communication device 10 may transmit a signal in a BF mode. Therefore, a manner of receiving and sending a signal may be flexibly configured.

Based on the first aspect, in a case in which the first transmit path and the second transmit path may be configured to transmit both a beamforming signal and a MIMO signal:

In a first possible implementation, the first transmit path is configured to transmit a first signal, and the second transmit path is configured to transmit a second signal; and the first signal and the second signal are transmitted in a time-division manner, so as to implement a time-division multiplexing MIMO signal.

In a second possible implementation, the first transmit path is configured to transmit a third signal, and the second transmit path is configured to transmit a fourth signal; and the third signal and the fourth signal are simultaneously transmitted, so as to implement a phase-modulated MIMO signal, where a phase of at least one of the third signal and the fourth signal varies with time.

In a third possible implementation, the first transmit path is configured to transmit a fifth signal, and the second transmit path is configured to transmit a sixth signal; and the fifth signal and the sixth signal are simultaneously transmitted, so as to implement a beamforming signal, where there is a phase difference between the fifth signal and the sixth signal, and the phase difference between the fifth signal and the sixth signal is set based on a phase difference between the first phase shifter and the second phase shifter.

Based on the first aspect, in a possible implementation, the first transmit path includes a first switch, and the second transmit path includes a second switch; a first input end of the first switch is coupled to a first output end of the splitter, and an output end of the first switch is coupled to the input end of the first transmit path; and a first input end of the second switch is coupled to a second output end of the splitter, and an output end of the second switch is coupled to the input end of the second transmit path. When the communication device is configured to transmit a time-division multiplexing MIMO signal, the first switch and the second switch are on and off in a time-division manner. For example, at a first time, the first switch is on, the second switch is off, and the first transmit path transmits the first signal; and at a second time, the second switch is off, the first switch is on, and the second transmit path transmits the second signal. When the communication device is configured to transmit a phase-modulated MIMO signal, the first switch and the second switch are simultaneously on, and the first transmit path and the second transmit path transmit the third signal and the fourth signal simultaneously. When the communication device is configured to transmit a beamforming signal, the first switch and the second switch are simultaneously on, and the first transmit path and the second transmit path transmit the fifth signal and the sixth signal simultaneously.

Based on the first aspect, in a possible implementation, the communication device further includes a third switch and a first transmit signal transmission channel; and an input end of the third switch is coupled to the first transmit signal transmission channel, a first output end of the third switch is coupled to an input end of the first splitter, and a second output end of the third switch is coupled to a second input end of the first switch.

The third switch is disposed, so that the first transmit path and the first transmit signal transmission channel can be directly coupled, so that the first signal transmitted by the first transmit path and the second signal transmitted by the second transmit path are independent of each other, thereby implementing that the communication device transmits a MIMO signal. In addition, the third switch may further enable the first transmit path to be coupled to the first output end of the splitter, so that the communication device transmits a beamforming signal.

Based on the first aspect, in a possible implementation, the first transmit signal transmission channel includes a first frequency mixer, and the first frequency mixer is configured to: receive a first analog signal; and perform up-conversion processing on the first analog signal and then provide an up-converted first analog signal to the input end of the first splitter; or provide the first analog signal to the first transmit path.

Based on the first aspect, in a possible implementation, the first transmit signal transmission channel further includes a first digital-to-analog converter; and the first digital-to-analog converter is configured to: receive a first digital signal, and convert the first digital signal into the first analog signal.

Based on the first aspect, in a possible implementation, the communication device further includes a second transmit signal transmission channel; and a second input end of the second switch is coupled to the second transmit signal transmission channel.

Based on the first aspect, in a possible implementation, the second transmit signal transmission channel includes a second frequency mixer; and the second frequency mixer is configured to: receive a second analog signal, perform up-conversion processing on the second analog signal, and then provide an up-converted second analog signal to the second transmit path.

Based on the first aspect, in a possible implementation, the second transmit signal transmission channel further includes a second digital-to-analog converter; and the second digital-to-analog converter is configured to: receive a second digital signal, and convert the second digital signal into the second analog signal.

Based on the first aspect, in a possible implementation, the communication device further includes a second splitter and a third transmit path, where the third transmit path includes a third phase shifter and a third power amplifier; an input end of the second splitter is coupled to the second output end of the first splitter; a first output end of the second splitter is coupled to the input end of the second transmit path, and a second output end of the second splitter is coupled to an input end of the third transmit path; the first transmit path, the second transmit path, and the third transmit path are configured to transmit a beamforming signal; and the first transmit path, the second transmit path, and the third transmit path are further configured to transmit a MIMO signal. The second splitter is disposed, so that the communication device can split more signals transmitted by a same transmit signal transmission channel, thereby meeting requirements of more communication scenarios (for example, a requirement of a communication scenario in which a phased array needs to be set).

Based on the first aspect, in a possible implementation, the communication device further includes a combiner, a first receive path, and a second receive path, where the first receive path includes a fourth phase shifter and a fourth power amplifier, and the second receive path includes a fifth phase shifter and a fifth power amplifier; an input end of the first receive path is coupled to a first receive antenna, and an input end of the second receive path is coupled to a second receive antenna; an output end of the first receive path and an output end of the second receive path are separately coupled to the combiner; and the first receive path and the second receive path are configured to receive a beamforming signal; and the first receive path and the second receive path are further configured to receive a multiple-input-multiple-output MIMO signal.

In this embodiment of this application, the first receive path and the second receive path are configured to receive both a beamforming signal and a MIMO signal, so that the communication device can flexibly configure a manner of receiving and sending a signal based on a requirement of a signal receiving and sending scenario. For example, in a vehicle-mounted radar scenario, when the vehicle needs to scan a range with a wide transverse area, the communication device 10 may receive a signal in a MIMO mode; and when the vehicle needs to cover a large forward space, the communication device 10 may receive a signal in a BF mode. In addition, because both the first receive path and the second receive path can receive a MIMO signal or a BF signal, it is not necessary to set a receive path dedicated to receiving a BF signal and a receive path dedicated to receiving a MIMO signal. It is also beneficial to reduce a layout area of the communication device.

Based on the first aspect, in a possible implementation, the communication device further includes: a digital signal processor, configured to: perform MIMO processing on the signals received by the first receive path and the second receive path.

Based on the first aspect, in a possible implementation, the communication device is further configured to: obtain a local oscillator signal, and provide the local oscillator signal to each of the first frequency mixer, the second frequency mixer, a third frequency mixer, and a fourth frequency mixer; and the first frequency mixer is coupled to the first transmit path, the second frequency mixer is coupled to the second transmit path, the third frequency mixer is coupled to the first receive path, and the fourth frequency mixer is coupled to the second receive path. A same local oscillator signal source is used to perform up-conversion processing and down-conversion processing on signals at the same time, so that a quantity of local oscillator signal sources or a quantity of local oscillator signal input ports can be reduced, and the layout area of the communication device can be further reduced.

Based on the first aspect, in a possible implementation, the communication device further includes a local oscillator, a fourth switch, a local oscillator signal input end, and a local oscillator signal output end, where a first input end of the fourth switch is coupled to the local oscillator signal input end, and a second input end of the fourth switch is coupled to a first output end of the local oscillator, and an output end of the fourth switch is coupled to each of the first transmit path, the second transmit path, the frequency mixer in the first receive path, and the frequency mixer in the second receive path; a second output end of the local oscillator is coupled to the local oscillator signal output end; and the fourth switch chooses to turn on, based on control of a controller, the local oscillator to obtain the local oscillator signal from the local oscillator, or chooses to turn on the local oscillator signal input end to input the local oscillator signal from the local oscillator signal input end. The local oscillator, the fourth switch, the local oscillator signal input end, and the local oscillator signal output end are disposed, so that the communication device may be used as both a main communication device and a slave communication device. When the communication device is used as a main communication device, the local oscillator signal generated by the local oscillator may be provided to other slave communication devices through the local oscillator signal output end. When the communication device is used as a slave communication device, the communication device may receive a local oscillator signal from the main communication device through the local oscillator signal input end.

According to a second aspect, an embodiment of this application provides an electronic device. The electronic device includes a transceiver chip, and the transceiver chip includes the first splitter, the first transmit path, and the second transmit path according to the first aspect.

Based on the second aspect, in a possible implementation, the transceiver chip further includes the third switch, the first transmit signal transmission channel, and the second transmit signal transmission channel according to the first aspect.

Based on the second aspect, in a possible implementation, the transceiver chip further includes the second splitter and the third transmit path according to the first aspect.

Based on the second aspect, in a possible implementation, the transceiver chip further includes the combiner, the first receive path, and the second receive path according to the first aspect.

Based on the second aspect, in a possible implementation, the electronic device further includes a digital processor chip, and the digital processor chip includes the digital signal processor according to the first aspect.

Based on the second aspect, in a possible implementation, the electronic device further includes a circuit board, and the transceiver chip and the digital processor chip are disposed on the circuit board.

According to a third aspect, an embodiment of this application provides a radar device, and the radar device includes the electronic device according to the second aspect.

The radar device may be configured to transmit a radar signal, the radar signal may be a millimeter wave signal, and an operating frequency band of the millimeter wave signal is within a range of 76 GHz to 81 GHz.

According to a fourth aspect, an embodiment of this application further provides a vehicle, and the vehicle includes the radar device according to the third aspect.

It should be understood that, the technical solutions in the second aspect to the fourth aspect of this application are consistent with the technical solution in the first aspect. Beneficial effects achieved in the various aspects and corresponding feasible implementations are similar, and details are not described again.

According to a fifth aspect, an embodiment of this application provides a communication device, where the communication device includes: a combiner, a first receive path, and a second receive path, where the first receive path includes a first phase shifter and a first power amplifier, and the second receive path includes a second phase shifter and a second power amplifier; an input end of the first receive path is coupled to a first receive antenna, and an input end of the second receive path is coupled to a second receive antenna; an output end of the first receive path and an output end of the second receive path are separately coupled to the combiner; the first receive path and the second receive path are configured to receive a beamforming signal; and the first receive path and the second receive path are further configured to receive a multiple-input-multiple-output MIMO signal.

In this embodiment of this application, the first receive path and the second receive path are configured to receive both a beamforming signal and a MIMO signal, so that the communication device can flexibly configure a manner of receiving and sending a signal based on a requirement of a signal receiving and sending scenario. For example, in a vehicle-mounted radar scenario, when the vehicle needs to scan a range with a wide transverse area, the communication device 10 may receive a signal in a MIMO mode; and when the vehicle needs to cover a large forward space, the communication device 10 may receive a signal in a BF mode. Therefore, a manner of receiving and sending a signal may be flexibly configured.

Based on the fifth aspect, in a case in which the first receive path and the second receive path may be configured to receive both a beamforming signal and a multiple-input-multiple-output MIMO signal:

In a first possible implementation, the first receive path is configured to receive a first signal, and the second receive path is configured to receive a second signal; and the first signal and the second signal are received in a time-division manner, so as to implement a time-division multiplexing MIMO signal.

In a second possible implementation, the first receive path is configured to receive a third signal, and the second receive path is configured to receive a fourth signal; and the third signal and the fourth signal are simultaneously received, so as to implement a phase-modulated MIMO signal, where a phase of at least one of the third signal and the fourth signal varies with time.

In a third possible implementation, the first receive path is configured to receive a fifth signal, and the second receive path is configured to receive a sixth signal; and the fifth signal and the sixth signal are simultaneously received, so as to implement a beamforming signal, where there is a phase difference between the fifth signal and the sixth signal, and the phase difference between the fifth signal and the sixth signal is set based on a phase difference between the first phase shifter and the second phase shifter.

Based on the fifth aspect, in a possible implementation, the first receive path includes a first switch, and the second receive path includes a second switch; a first output end of the first switch is coupled to a first input end of the combiner, and an input end of the first switch is coupled to the output end of the first receive path; and a first output end of the second switch is coupled to a second input end of the combiner, and an input end of the second switch is coupled to the output end of the second receive path.

When the communication device is configured to receive a time-division multiplexing MIMO signal, the first switch and the second switch are on and off in a time-division manner. For example, at a first time, the first switch is on, the second switch is off, and the first receive path receives the first signal; and at a second time, the second switch is off, the first switch is on, and the second receive path receives the second signal. When the communication device is configured to receive a phase-modulated MIMO signal, the first switch and the second switch are simultaneously on, and the first receive path and the second receive path receive the third signal and the fourth signal simultaneously. When the communication device is configured to receive a beamforming signal, the first switch and the second switch are simultaneously on, and the first receive path and the second receive path receive the fifth signal and the sixth signal simultaneously.

Based on the fifth aspect, in a possible implementation, the communication device further includes a third switch and a first echo signal transmission channel; and an output end of the third switch is coupled to the first echo signal transmission channel, a first input end of the third switch is coupled to an output end of the first combiner, and a second input end of the third switch is coupled to a second output end of the first switch.

The third switch is disposed, so that the first receive path and the first echo signal transmission channel can be directly coupled, so that the first signal received by the first receive path and the second signal received by the second receive path are independent of each other, thereby implementing that the communication device receives a MIMO signal. In addition, the third switch may further enable the first receive path to be coupled to the first input end of the combiner, so that the communication device receives a beamforming signal.

Based on the fifth aspect, in a possible implementation, the first echo signal transmission channel includes a first frequency mixer, and the first frequency mixer is configured to: receive a first analog signal from a first combiner; and perform down-conversion processing on the first analog signal and generate a second analog signal.

Based on the fifth aspect, in a possible implementation, the first echo signal transmission channel further includes a first analog-to-digital conversion circuit; and the first analog-to-digital conversion circuit is configured to: receive the first analog signal from the first frequency mixer and convert the first analog signal into a first digital signal.

Based on the fifth aspect, in a possible implementation, the communication device further includes a second echo signal transmission channel; and a second output end of the second switch is coupled to the second echo signal transmission channel.

Based on the fifth aspect, in a possible implementation, the second echo signal transmission channel includes a second frequency mixer; and the second frequency mixer is configured to: receive a third analog signal from the second receive channel; and perform down-conversion processing on the third analog signal and generate a fourth analog signal.

Based on the fifth aspect, in a possible implementation, the second echo signal transmission channel further includes a second analog-to-digital conversion circuit; and the second analog-to-digital conversion circuit is configured to: receive a fourth analog signal from the second frequency mixer, and convert the fourth analog signal into a second digital signal.

Based on the fifth aspect, in a possible implementation, the communication device further includes a second combiner and a third receive path, where the third receive path includes a third phase shifter and a third power amplifier; an output end of the second combiner is coupled to a second input end of the first combiner; a first input end of the second combiner is coupled to an output end of the second receive path, and a second input end of the second combiner is coupled to an output end of the third receive path; the first receive path, the second receive path, and the third receive path are configured to receive a beamforming signal; and the first receive path, the second receive path, and the third receive path are further configured to receive a MIMO signal. The second combiner is disposed, so that the communication device can combine more signals transmitted by a same receive signal transmission channel, thereby meeting requirements of more communication scenarios (for example, a requirement of a communication scenario in which a phased array needs to be set).

According to a sixth aspect, an embodiment of this application provides an electronic device. The electronic device includes a transceiver chip, and the transceiver chip includes the communication device according to the fifth aspect.

BRIEF DESCRIPTION OF THE DRAWINGS

To describe the technical solutions in embodiments of this application more clearly, the following briefly introduces the accompanying drawings required for describing embodiments of this application. Apparently, the accompanying drawings in the following description show merely some embodiments of this application, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in embodiments of this application with reference to the accompanying drawings in embodiments of this application. Apparently, the described embodiments are some but not all of embodiments of this application. All other embodiments obtained by a person of ordinary skill in the art based on embodiments of this application without creative efforts shall fall within the protection scope of this application.

The "first", the "second", and similar terms mentioned herein do not indicate any order, quantity or significance, but are used to only distinguish different components. Similarly, "one", "a", and similar terms also do not indicate a quantity limitation, but indicates that there is at least one. "Connected", "coupled", and similar terms are not limited to a physical or mechanical connection, but may include an electrical connection, regardless of a direct or indirect connection, equivalent to connection in a broad sense.

The term "exemplary" or "for example" in embodiments of this application means "used as an example, an illustration, or a description. Any embodiment or design scheme described as an "exemplary" or "for example" in embodiments of this application should not be explained as being more preferred or having more advantages than another embodiment or design scheme. Exactly, use of the word "example", "for example", or the like is intended to present a relative concept in a specific manner. In the descriptions of embodiments of this application, unless otherwise stated, "a plurality of" means two or more than two. For example, a plurality of communication devices refers to two or more communication devices. A plurality of transmit signal transmission channels refers to two or more transmit signal transmission channels.

Figure 1:
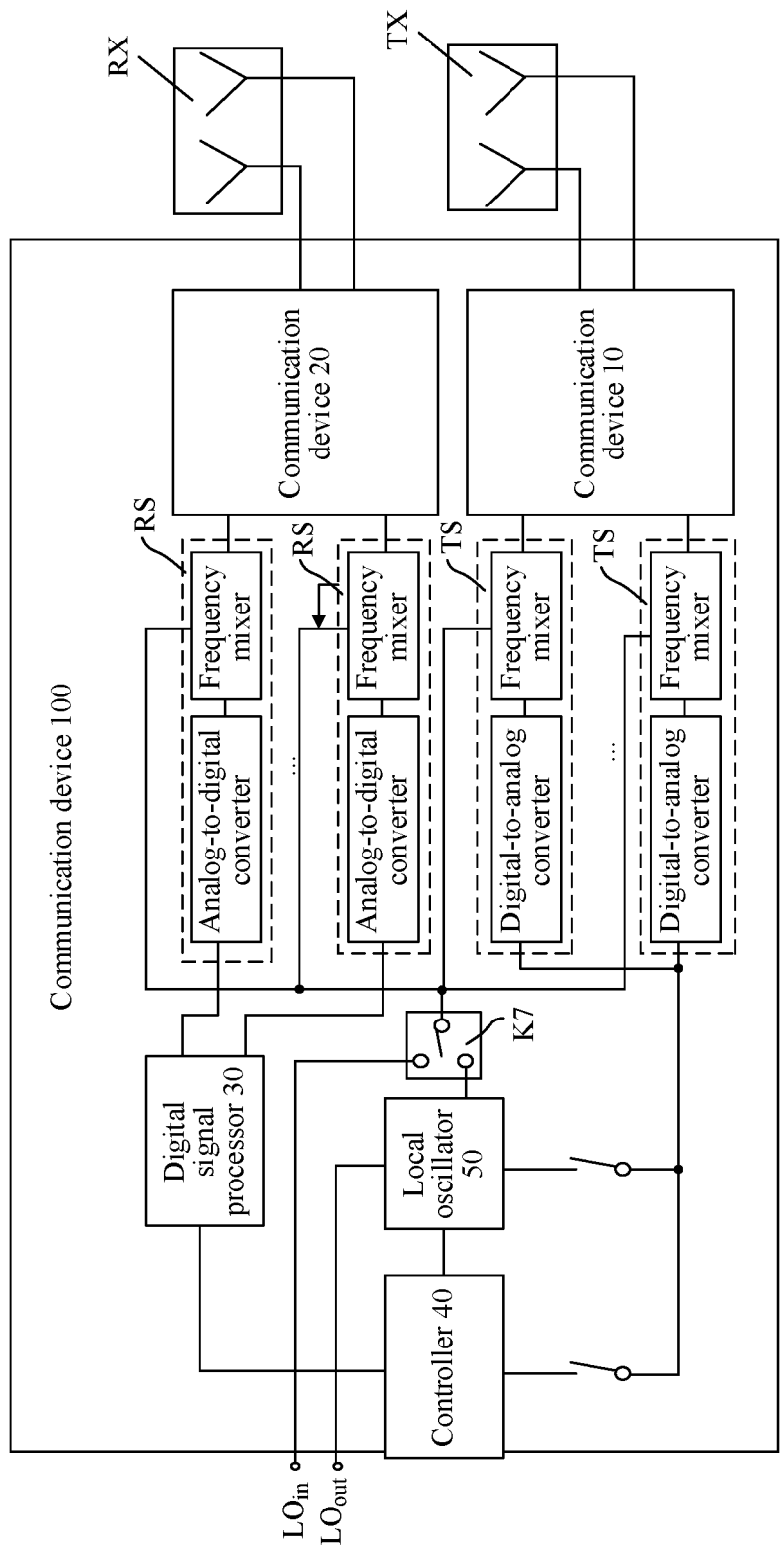
FIG. 1 is a schematic diagram of a structure of a communication device 100 according to an embodiment of this application.

FIG. 1 is a schematic diagram of a structure of a communication device 100 according to an embodiment of this application.

As shown in FIG. 1, the communication device 100 includes a communication device 10 and a communication device 20. The communication device 10 may be coupled to a transmit antenna TX, to transmit a radio frequency signal through the transmit antenna TX. The communication device 20 may be coupled to a receive antenna RX, to receive an echo signal through the receive antenna RX. In a specific implementation, the communication device 10 may transmit a signal in a MIMO mode, or may transmit a signal in a BF mode. Similarly, the communication device 20 may receive a signal in a MIMO mode, or may receive a signal in a BF mode. A signal transmitting mode may be converted according to a requirement of an application scenario, to transmit signals in different modes. The transmit antenna TX may be a transmit antenna array, and the receive antenna RX may be a receive antenna array.

Figure 2:
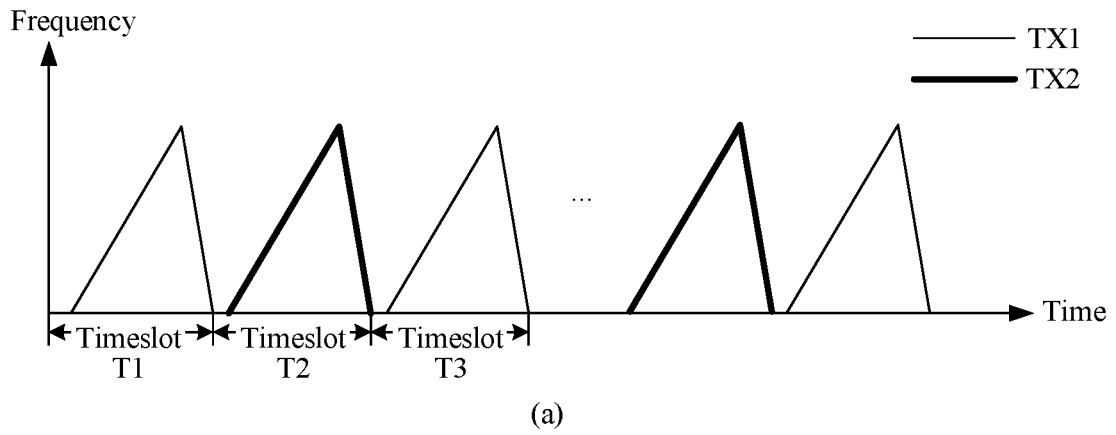
FIG. 2 is a schematic waveform diagram of a signal in a MIMO mode according to an embodiment of this application.
Figure 2:
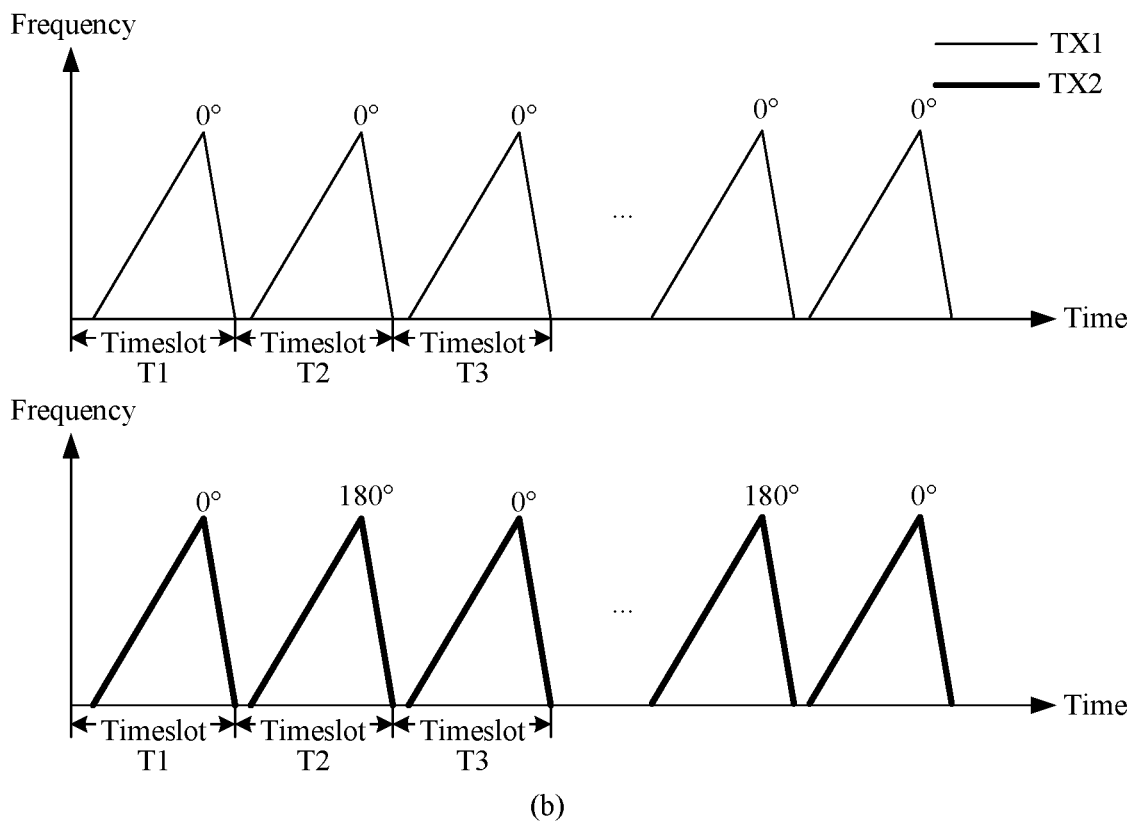

The MIMO mode in embodiments of this application may include but is not limited to: a time-division multiplexing (TDM) MIMO mode, or a phase modulation (PM) MIMO mode. The PM-MIMO may include but is not limited to binary phase modulation, octal phase modulation, and the like. (b) in FIG. 2 shows a waveform of a signal in a binary phase modulation (BPM)-MIMO mode. For example, two transmit antennas TX1 and TX2 are used to transmit signals. When a signal is transmitted in the TDM-MIMO mode, the TX1 and the TX2 transmit signals in time division, where a phase of a signal transmitted by the TX1 and a phase of a signal transmitted by the TX2 may be the same. (a) in FIG. 2 shows a waveform of a signal in a TDM-MIMO mode. When a signal is transmitted in the PM-MIMO mode, the TX1 and the TX2 may transmit signals in a same timeslot, but a phase of at least one signal of the signal transmitted by the TX1 or the signal transmitted by the TX2 varies with the timeslot. The phase of the signal transmitted by TX1 and the phase of the signal transmitted by TX2 are determined based on modulation of symbols. (b) in FIG. 2 schematically shows a case in which a phase of a signal transmitted by a TX1 in different timeslots is unchanged and a phase of a signal transmitted by a TX2 in different timeslots is different. The phase of the signal transmitted by the TX2 in a timeslot T1 is 0°, and the phase of the signal transmitted by the TX2 in a timeslot T2 is 180°. It should be noted that, a phase of each signal is not specifically limited in embodiments of this application. The BF mode in embodiments of this application may include but is not limited to: an orthogonal frequency-division multiplexing (OFDM) mode, a phase-modulated continuous wave (PMCW) mode, or a frequency-modulated continuous wave (FMCW) mode, where OFDM, PMCW, and FMCW are all common modulation schemes. Details are not described in embodiments of this application.

In a first possible implementation, the communication device 10 may be integrated on a first chip, and the communication device 20 may be integrated on a second chip different from the first chip.

In a second possible implementation, the communication device 10 and the communication device 20 may be integrated on a same chip, to form a system on chip (SoC).

Refer to FIG. 1. The communication device 100 shown in FIG. 1 may further include a digital signal processor 30. The digital signal processor 30 may process the echo signal received by the communication device 20, for example, perform MIMO separation processing on the received echo signal, or perform BF processing on the received echo signal. In addition, in some scenarios (for example, in a scenario in which a controller 40, as shown in FIG. 1, generates a fundamental frequency signal to be transmitted), a fundamental frequency signal before up-conversion may further be processed, for example, phase shift processing is performed on multiple fundamental frequency signals. In a possible implementation, the digital signal processor 30 may be integrated into the Soc.

The communication device 100 shown in FIG. 1 may be used in a radar device. In this scenario, the digital signal processor 30 may further generate target information of a to-be-detected target based on the radio frequency signal transmitted by the communication device 10 and the echo signal received by the communication device 20. When the radar device is disposed in a vehicle, the to-be-detected target, for example, may include but is not limited to: a lane line, a pedestrian, a tree, a front vehicle, and an obstacle. The target information of the to-be-detected target may include but is not limited to: lane line location information, information about a distance between a vehicle and a vehicle in front of it, information about an orientation between a pedestrian and a vehicle, information about an obstacle location, or the like. Therefore, the vehicle can implement functions such as lane keeping, automatic parking, or obstacle avoidance. In addition, when the vehicle needs to scan a range with a wide transverse region, the communication device 10 may transmit a signal in the MIMO mode. When the vehicle needs to cover large forward space, the communication device 10 may transmit a signal in a BF mode. It should be noted that, a radar signal transmitted by the radar device may be a millimeter wave signal, and an operating frequency band of the millimeter wave signal is usually within a range of 76 GHz to 81 GHz.

The communication device 100 shown in FIG. 1 further includes a controller 40. The controller 40 is coupled to each of the digital signal processor 30, the communication device 10, and the communication device 20. The controller 40 is configured to control a transmitting mode of a transmit signal and a receiving mode of an echo signal. For example, the communication device 10 may be controlled to transmit a signal in a BF mode or a signal in a MIMO mode by controlling a phase of a phase shifter disposed in the communication device 10 and on/off of each switch disposed in the communication device 10. For a specific implementation in which the communication device 10 transmits the signal in the BF mode or the signal in the MIMO mode, refer to related descriptions of embodiments shown in FIG. 3 to FIG. 8. For another example, the controller 40 controls, by controlling a phase of a phase shifter disposed in the communication device 20 and on/off of each switch disposed in the communication device 20, the communication device 20 to receive an echo signal in the BF mode or an echo signal in the MIMO mode. For a specific implementation in which the communication device 20 receives the echo signal in the BF mode or the echo signal in the MIMO mode, refer to related descriptions of embodiments shown in FIG. 9 to FIG. 14. In addition, the controller 40 may further control amplification gains of each power amplifier in the communication device 10 and each power amplifier in the communication device 20. In addition, the controller 40 may further control a modulation manner of a to-be-transmitted signal, for example, including but not limited to: OFDM modulation, PMCW modulation, or the like. The controller 40 may further provide information about the to-be-transmitted signal to the digital signal processor 30, so that the digital signal processor 30 demodulates the echo signal based on the transmitted signal, or generates the target information of the to-be-detected target based on the transmitted signal and the echo signal.

The communication device 100 in embodiments of this application further includes a plurality of transmit signal transmission channels TS and a plurality of echo signal transmission channels RS. In a possible implementation, components included in the plurality of transmit signal transmission channels TS may be integrated into chips included in the communication device 10, and components included in the plurality of echo signal transmission channels RS may be integrated into chips included in the communication device 20. In another possible implementation, components included in the plurality of transmit signal transmission channels TS may be disposed outside the communication device 10, and components included in the plurality of echo signal transmission channels RS may be disposed outside the communication device 20. FIG. 1 shows a case in which components included in the plurality of transmit signal transmission channels TS and components included in the plurality of echo signal transmission channels RS are all disposed outside the communication device 10 and the communication device 20.

The components included in each transmit signal transmission channel TS may include, but are not limited to a digital-to-analog converter and a frequency mixer. The digital-to-analog converter is configured to perform digital-to-analog conversion on a to-be-sent signal to generate an analog signal. The frequency mixer is configured to perform up-conversion processing on an analog signal. The components included in each echo signal transmission channel RS may include but are not limited to an analog-to-digital converter and a frequency mixer. The frequency mixer is configured to perform down-conversion processing on an echo signal, and the analog-to-digital converter is configured to convert an analog signal into a digital signal.

In this embodiment of this application, a frequency mixer in the plurality of transmit signal transmission channels TS may be configured to input a local oscillator signal and an intermediate frequency signal, and a frequency mixer in the plurality of echo signal transmission channels RS is configured to input a local oscillator signal and a radio frequency signal. In a possible implementation, the local oscillator signal input by the frequency mixer in the plurality of transmit signal transmission channels TS and the local oscillator signal input by the frequency mixer in the plurality of echo signal transmission channels TS are the same and come from a same local oscillator source.

In a first possible implementation, a local oscillator (LO) configured to generate a local oscillator signal may be disposed outside the communication device 100. In this case, the communication device 100 may include an input port $LO_{in}$, configured to input a local oscillator signal.

In a second possible implementation, a local oscillator 50 configured to generate a local oscillator signal may be disposed inside the communication device 100. In a scenario in which there are a plurality of communication devices 100, to implement synchronization of local oscillator signals of the plurality of communication devices 100, a main communication device 100 is usually disposed. The main communication device 100 is configured to provide a generated local oscillator signal to other communication devices 100. In this case, the communication device 100 may further include an output port $LO_{out}$ of the local oscillator signal, so that when serving as a main communication device, the communication device 100 provides a local oscillator signal to other communication devices 100.

In addition, a switch K7 may be further disposed in the communication device 100. The switch K7 is configured to implement switching between generating a local oscillator signal inside the communication device 100 or externally inputting a local oscillator signal. Specifically, the switch K7 may be a two-input switch. A first input end of the switch K7 is coupled to the input port $LO_{in}$, and a second input end of the switch K7 is coupled to an output end of the local oscillator 50. An output end of the switch K7 is coupled to an input end of a local oscillator signal of a frequency mixer in the transmit signal transmission channel TS and the echo signal transmission channel RS. The on/off of the switch K7 is controlled by the controller 40.

In a possible implementation of this embodiment of this application, an intermediate frequency signal input to a frequency mixer in each transmit signal transmission channel TS may be generated by the controller 40.

In another possible implementation of this embodiment of this application, the intermediate frequency signal input to the frequency mixer in each transmit signal transmission channel TS may be a frequency sweep signal generated by the local oscillator 50. The local oscillator 50 may be controlled by the controller 40 to generate a frequency sweep signal.

Figure 3:
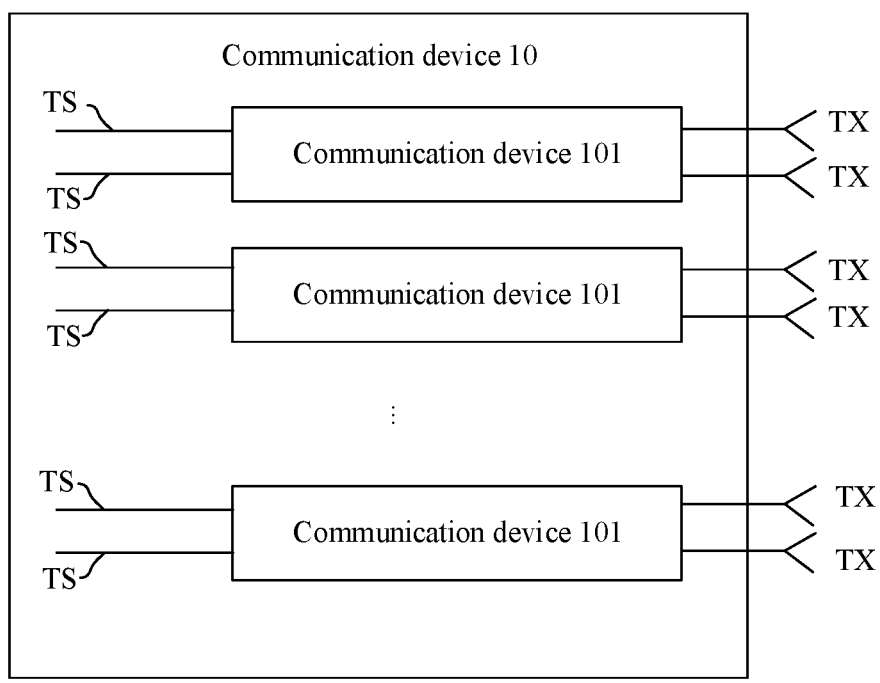
FIG. 3 is a schematic diagram of a structure of a communication device 10 according to an embodiment of this application.

FIG. 3 is a schematic diagram of a structure of the communication device 10 shown in FIG. 1. The communication device 10 includes at least one communication device 101. The communication device 101 may be a communication device 101 shown in any embodiment in FIG. 4 to FIG. 8. In a specific implementation, a plurality of communication devices 101 may be integrated on different chips respectively, or may be integrated on a same chip. Therefore, each communication device 101 may transmit a signal in a BF mode or transmit a signal in a MIMO mode. In addition, the plurality of communication devices 101 may further jointly transmit a signal in the BF mode, or jointly transmit a signal in the MIMO mode, or some communication devices 101 transmit a signal in the BF mode, and other communication devices 101 transmit a signal in the MIMO mode. In addition, an input side of each communication device 101 may be coupled to at least one transmit signal transmission channel TS, and an output side of each communication device 101 may be coupled to at least one transmit antenna TX. FIG. 3 schematically shows a case in which a communication device 101 is coupled to two transmit signal transmission channels TS and coupled to two transmit antennas TX. For a specific structure of the transmit signal transmission channel TS, refer to related descriptions in FIG. 1. Details are not described herein again.

The following describes in detail the communication device 101 shown in FIG. 3 by using embodiments shown in FIG. 4 to FIG. 8.

Figure 4:
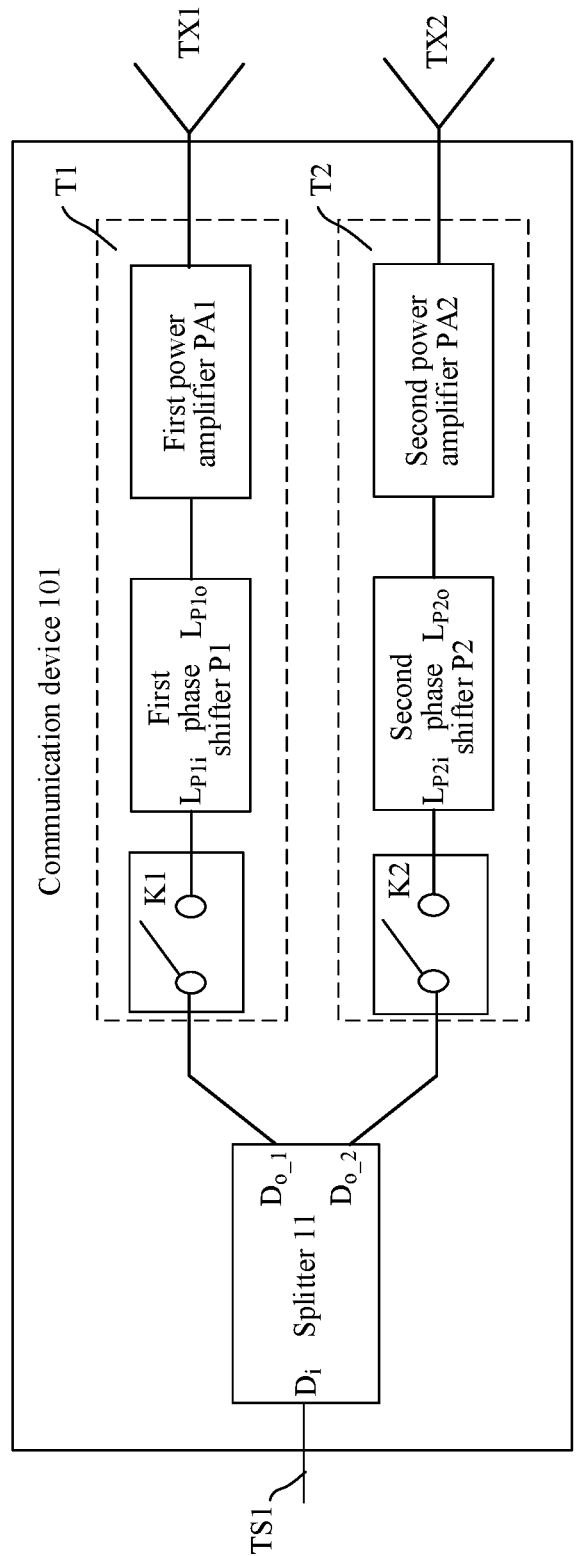
FIG. 4 is a schematic diagram of a structure of a communication device 101 according to an embodiment of this application.

As shown in FIG. 4, the communication device 101 includes a splitter 11, a first transmit path T1, and a second transmit path T2. The first transmit path T1 is coupled to the first transmit antenna TX1, and the second transmit path is coupled to the second transmit antenna TX2. As shown in FIG. 4, the splitter 11 includes an input end $D_i$, a first output end $D_{o\_1}$, and a second output end $D_{o\_2}$. The first output end $D_{o\_1}$ of the splitter 11 is coupled to an input end of the first transmit path T1, and the second output end $D_{o\_2}$ of the splitter 11 is coupled to an input end of the second transmit path T2. The input end $D_i$ of the splitter 11 may be coupled to a first transmit signal transmission channel TS1. The first transmit signal transmission channel TS1 may provide a first radio frequency signal to the input end $D_i$ of the splitter 11. After performing splitting processing on the first radio frequency signal, the splitter 11 provides a first radio frequency signal to the first output end $D_{o\_1}$ and the second output end $D_{o\_2}$ respectively. Based on the signal output by the splitter 11, the first transmit path T1 and the second transmit path T2 may transmit a signal in the MIMO mode or a signal in the BF mode.

In this embodiment of this application, the first transmit path T1 and the second transmit path T2 of the communication device 101 are configured to transmit both a beamforming signal and a MIMO signal, so that the communication device 101 can flexibly configure a signal transmitting manner according to a requirement of a signal receiving and sending scenario. In addition, because both the first transmit path T1 and the second transmit path T2 can transmit a MIMO signal or a BF signal, it is not necessary to set a transmit path dedicated to transmitting a BF signal and a transmit path dedicated to transmitting a MIMO signal. It is also beneficial to reduce a layout area of the communication device 101.

In a specific implementation, the first transmit path T1 includes a first phase shifter P1 and a first power amplifier PA1, and the second transmit path T2 includes a second phase shifter P2 and a second power amplifier PA2. The first output end $D_{ot\_1}$ of the splitter 11 is coupled to an input end $L_{P1i}$ of the first phase shifter P1, an output end $L_{P1o}$ of the first phase shifter P1 is coupled to an input end of the first power amplifier PA1, and an output end of the first power amplifier PA1 is coupled to the first transmit antenna TX1. The second output end $D_{ot\_2}$ of the splitter 11 is coupled to an input end $L_{P2i}$ of the second phase shifter P2, an output end $L_{P2o}$ of the second phase shifter P2 is coupled to an input end of the second power amplifier PA2, and an output end of the second power amplifier PA2 is coupled to the second transmit antenna TX2. It should be noted that, the first transmit path T1 and the second transmit path T2 may further include more components. For example, the first transmit path T1 and the second transmit path T2 may further respectively include a filter, where the filter may be coupled between a phase shifter and a power amplifier in each transmit path, or coupled between an output end of the splitter 11 and a phase shifter.

Further, in this embodiment of this application, the first transmit path T1 further includes a first switch K1, and the second transmit path T2 further includes a second switch K2. The first switch K1 is coupled between the first output end $D_{o\_1}$ of the splitter 11 and the first phase shifter P1, and the second switch K2 is coupled between the second output end $D_{o\_2}$ of the splitter 11 and the second phase shifter P2. Therefore, on and off of the first switch K1 and the second switch K2 are controlled, so that the first transmit path T1 and the second transmit path T2 transmit a signal in the MIMO mode or transmit a signal in the BF mode. Details are described below.

When the first transmit path T1 and the second transmit path T2 transmit a signal in the BF mode, both the first switch K1 and the second switch K2 are turned on, the first output end $D_{o\_1}$ of the splitter 11 and the input end $L_{P1i}$ of the first phase shifter P1 form a path, and the second output end $D_{o\_2}$ of the splitter 11 and the input end $L_{P2i}$ of the second phase shifter P2 form a path. In this case, the splitter 11 provides the first radio frequency signal to the first phase shifter P1 and the second phase shifter P2 respectively. The first phase shifter P1 and the second phase shifter P2 respectively perform phase shift on the received signal to generate two signals of different phases, namely, a first signal and a second signal. The first signal is amplified by the first power amplifier PA1 and then transmitted through the transmit antenna TX1, and the second signal is amplified by the second power amplifier PA2 and then transmitted through the transmit antenna TX2.

When the first transmit path T1 and the second transmit path T2 transmit a signal in the PM-MIMO mode, both the first switch K1 and the second switch K2 are turned on, the first output end $D_{o\_1}$ of the splitter 11 and the input end $L_{P1i}$ of the first phase shifter P1 form a path, and the second output end $D_{o\_2}$ of the splitter 11 and the input end $L_{P2i}$ of the second phase shifter P2 form a path. In this case, the splitter 11 provides the first radio frequency signal to the first phase shifter P1 and the second phase shifter P2 respectively. In a first timeslot, the first phase shifter P1 generates a third signal after performing a phase shift on the received signal, and the second phase shifter P2 generates a fourth signal after performing a phase shift on the received signal. The third signal and the fourth signal may have a same phase, or may have different phases. In a second timeslot, the first phase shifter P1 generates a fifth signal after performing a phase shift on the received signal, and the second phase shifter P2 generates a sixth signal after performing a phase shift on the received signal. The fifth signal and the sixth signal may have a same phase, or may have different phases. The fourth signal and the sixth signal have different phases, or the third signal and the fifth signal have different phases. In the first timeslot, the third signal is amplified by the first power amplifier PA1 and then transmitted through the transmit antenna TX1, and the fourth signal is amplified by the second power amplifier PA2 and then transmitted through the transmit antenna TX2. In the second timeslot, the fifth signal is amplified by the first power amplifier PA1 and then transmitted through the transmit antenna TX1, and the sixth signal is amplified by the second power amplifier PA2 and then transmitted through the transmit antenna TX2.

When the first transmit path T1 and the second transmit path T2 transmit a signal in the TDM-MIMO mode, the first switch K1 and the second switch K2 may be turned on and turned off in a time-division manner. In this way, in the first timeslot, the first output end $D_{o\_1}$ of the splitter 11 and the input end $L_{P1i}$ of the first phase shifter P1 form a path, and the second output end $D_{o\_2}$ of the splitter 11 is disconnected from the second phase shifter P2. In the second timeslot, a path is formed between the second output end $D_{o\_2}$ of the splitter 11 and the input end $L_{P2i}$ of the second phase shifter P2, and the first output end $D_{o\_1}$ of the splitter 11 is disconnected from the first phase shifter P1. In addition, to enable the splitter to operate normally, a matching load may be disposed between the first output end $D_{o\_1}$ of the splitter 11 and the first phase shifter P1, and a matching load may be disposed between the second output end $D_{o\_2}$ of the splitter 11 and the second phase shifter P2. Matching loads are not shown in the figures. In this case, in the first timeslot, the splitter 11 provides the first radio frequency signal to the first phase shifter P1, and outputs a seventh signal by using the first phase shifter P1; and in the second slot, the splitter 11 provides the first radio frequency signal to the second phase shifter P2, and outputs an eighth signal by using the second phase shifter P2. When a signal in the TDM-MIMO mode is transmitted, phases of the first phase shifter P1 and the second phase shifter P2 may be fixed at a same value, so that the seventh signal and the eighth signal have a same phase. In the first timeslot, the seventh signal is amplified by the first power amplifier PA1 and then transmitted through the first transmit antenna TX1. In the second timeslot, the eighth signal is amplified by the second power amplifier PA2, and then transmitted through the second transmit antenna TX2.

Figure 5:
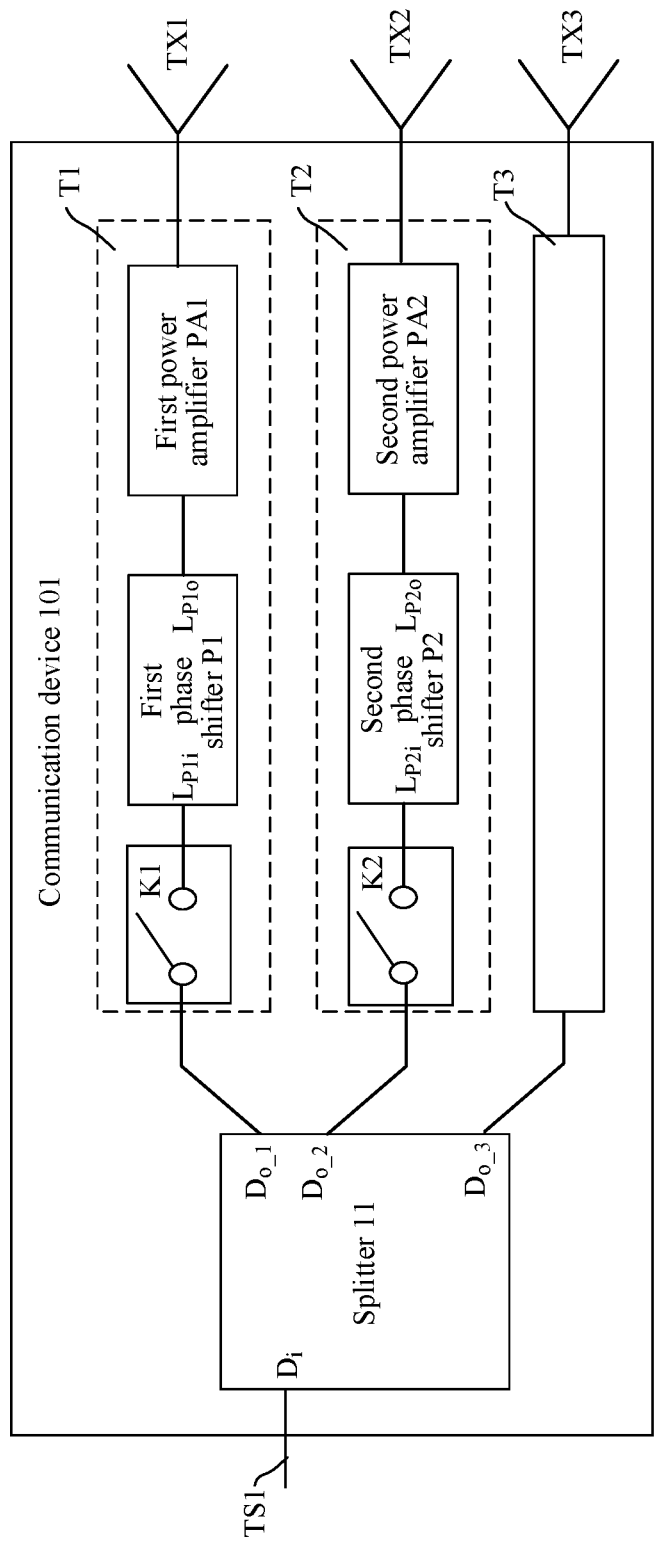
FIG. 5 is still another schematic diagram of a structure of a communication device 101 according to an embodiment of this application.

The foregoing describes a schematic diagram of a structure of the communication device 101 when the splitter is provided with two output ends. In a possible implementation, the splitter 11 may further include more output ends such as a third output end and a fourth output end. Correspondingly, the communication device 101 may further include more transmit paths, such as a third transmit path coupled to the third output end of the splitter 11, and the fourth transmit path coupled to the fourth output end of the splitter 11. The third transmit path, the fourth transmit path, and more transmit paths may transmit a signal in the BF mode or transmit a signal in the MIMO mode. A working principle of transmitting a signal in the BF mode and a working principle of transmitting a signal in the MIMO mode are described above, and details are not described herein again. As shown in FIG. 5, FIG. 5 is a specific structure of a communication device 101 when the splitter 11 includes three output ends.

Figure 6:
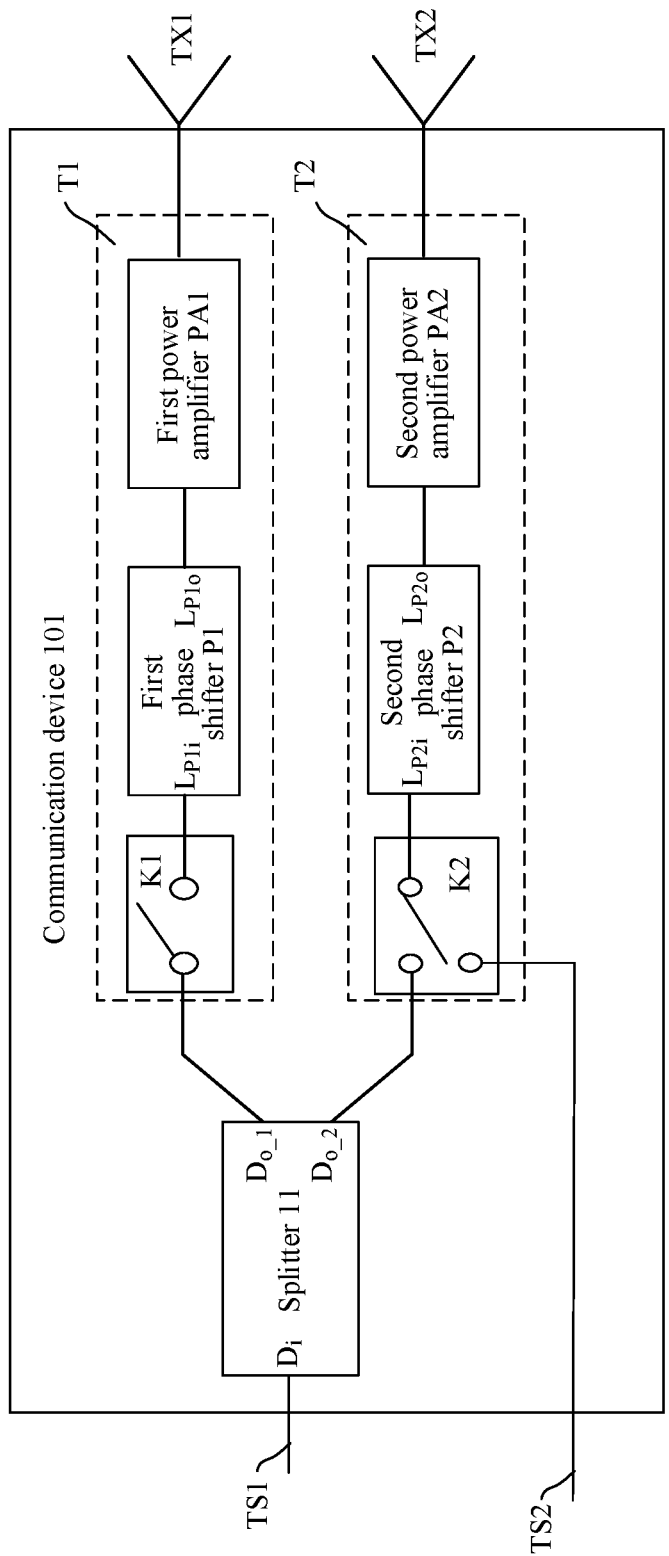
FIG. 6 is still another schematic diagram of a structure of a communication device 101 according to an embodiment of this application.

It can be seen from the embodiment shown in FIG. 4 that, in the communication device 101, the splitter 11 receives the first radio frequency signal through a first signal path, and divides the received first radio frequency signal into two signals for transmitting through the first transmit path T1 and the second transmit path T2. In a possible implementation, the first transmit path T1 or the second transmit path T2 may directly receive a second radio frequency signal from the second radio frequency signal transmission channel TS2 without passing through the splitter 11. In this case, the first switch K1 or the second switch K2 may be a multi-input switch. The following uses an example in which the second switch K2 is a multi-input switch for description. In this implementation, a coupling relationship between components in the communication device 101 is shown in FIG. 6. In FIG. 6, the input end $D_i$ of the splitter 11 is coupled to the first transmit signal transmission channel TS1, and the first output end $D_{o\_1}$ and the second output end $D_{o\_2}$ of the splitter 11 are respectively coupled to the input end of the first switch K1 and the first input end of the second switch K2. Different from the structure of the communication device 101 shown in FIG. 4, the second input end of the second switch K2 is coupled to the second transmit signal transmission channel TS2. Therefore, when radio frequency signals transmitted by different signal transmission channels need to be transmitted, the first switch K1 is turned on, and a path is formed between the first output end $D_{o\_1}$ of the splitter 11 and the input end $L_{P1i}$ of the first phase shifter P1. The second switch K2 controls forming a path between the second transmit signal transmission channel TS2 and the input end $L_{P2i}$ of the second phase shifter P2. In this case, the first radio frequency signal transmitted by the first transmit signal transmission channel TS1 is provided to the first phase shifter P1 by using the first output end $D_{o\_1}$ of the splitter 11, and the first radio frequency signal is transmitted to the first power amplifier PA1 after being phase-shifted by the first phase shifter P1. Power amplification is performed on the first radio frequency signal by the first power amplifier PA1, and then the first radio frequency signal is transmitted by using the first antenna TX1. The second radio frequency signal transmitted by the second transmit signal transmission channel TS2 is directly provided to the second phase shifter P2 by using the switch K2, and the second radio frequency signal is transmitted to the second power amplifier PA2 after being phase-shifted by the second phase shifter P2. Power amplification is performed on the second radio frequency signal by the second power amplifier PA2, and then the second radio frequency signal is transmitted by using the second antenna TX2.

Figure 7:
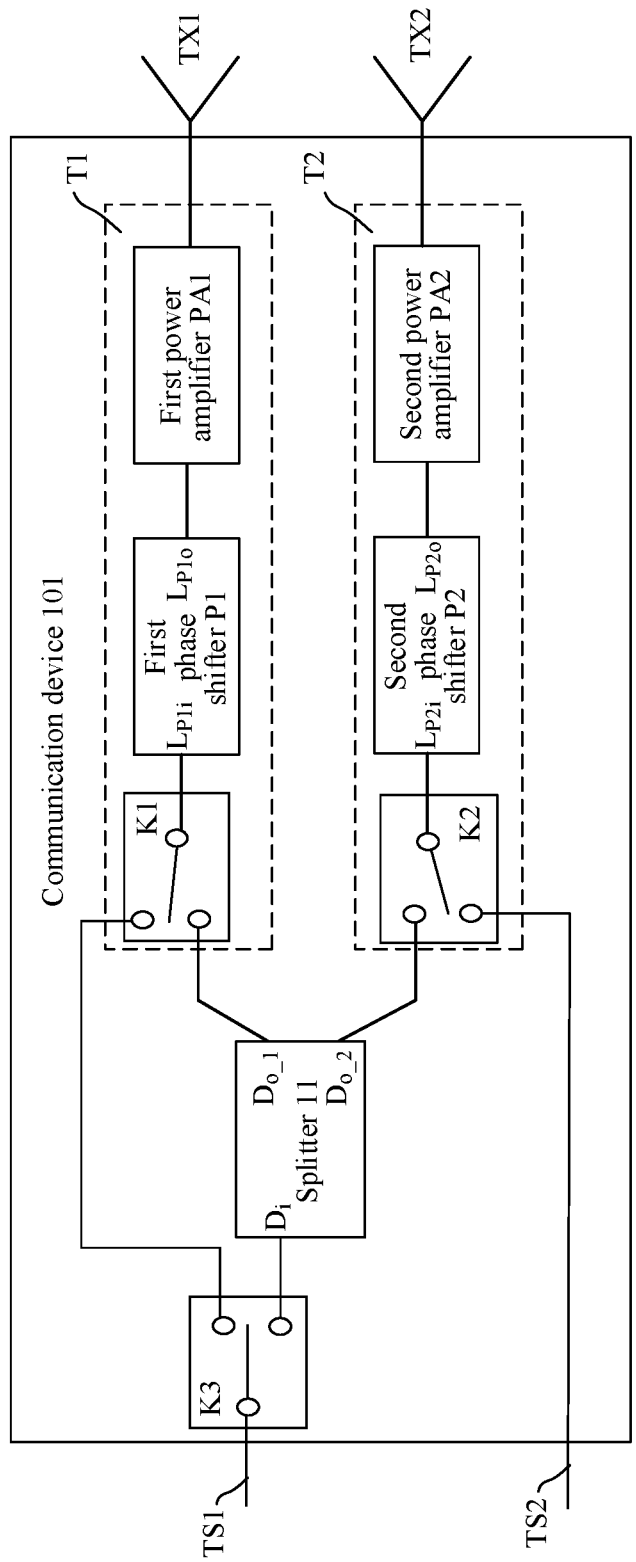
FIG. 7 is still another schematic diagram of a structure of a communication device 101 according to an embodiment of this application.

It can be seen from embodiments shown in FIG. 4 to FIG. 6 that the first radio frequency signal passes through the splitter 11 and outputs one or more signals. In still another possible implementation of this embodiment of this application, when a plurality of radio frequency signals need to be received from a plurality of transmit signal transmission channels, and any one radio frequency signal does not need to be split, one of the radio frequency signals may be directly provided to one of the transmit paths without using a splitter, so as to reduce a loss of the first radio frequency signal. Based on this, FIG. 7 is still another schematic diagram of a structure of a communication device 101 according to an embodiment of this application. In FIG. 7, a splitter 11, a first transmit path T1, and a second transmit path T2 are included. The first transmit path T1 includes a first switch K1, a first phase shifter P1, and a first power amplifier PA1. The second transmit path T2 includes a second switch K2, a second phase shifter P2, and a second power amplifier PA2. The second switch K2 is a multi-input switch. For a connection relationship between components, refer to related descriptions in embodiments shown in FIG. 4 to FIG. 6, and details are not described herein again. Different from the implementations shown in FIG. 4 to FIG. 6, in this implementation, both the first switch K1 and the second switch K2 are multi-input switches, and in addition, a third switch K3 is further included. The third switch K3 may be a multi-output switch. The figure schematically shows that the third switch K3 is a two-output switch. For a connection relationship between the second switch K2 and each component or transmission channel, refer to related description in FIG. 6. A first input end of the first switch K1 is coupled to a first output end $D_{o\_1}$ of the splitter 11. A second input end of the first switch K1 is coupled to a first output end of the third switch K3, a second output end of the third switch K3 is coupled to an input end $D_i$ of the splitter 11, and an input end of the third switch K3 is coupled to a first transmit signal transmission channel TS1. Therefore, the first transmit signal transmission channel TS1 is coupled to an input end $L_{P1i}$ of the first phase shifter P1 by using the third switch K3 and the first switch K1, and directly provides the first radio frequency signal to the input end $L_{P1i}$ of the first phase shifter P1.

Figure 8:
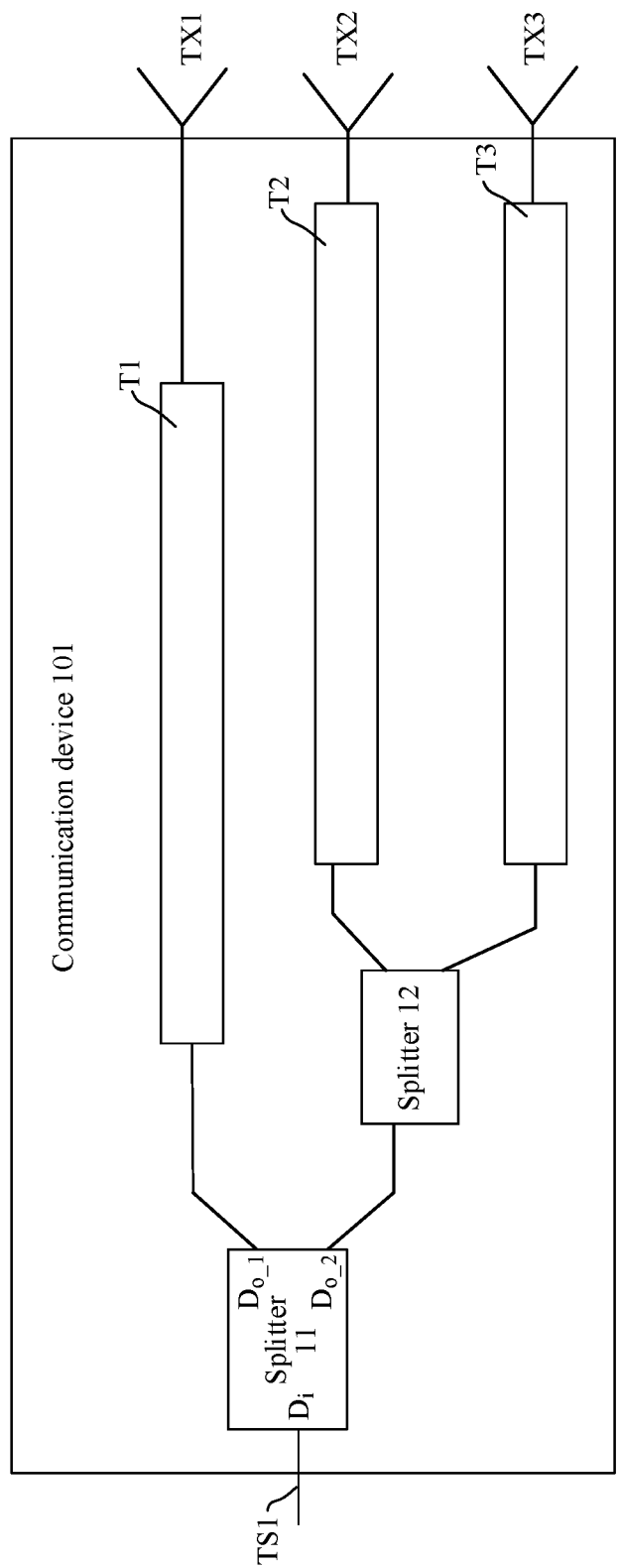
FIG. 8 is still another schematic diagram of a structure of a communication device 101 according to an embodiment of this application.

It can be learned from embodiments shown in FIG. 4 to FIG. 7 that the communication device 101 includes a splitter. In a possible implementation, more splitters may be further disposed on an output side of the splitter 11, so as to implement more split signals. Refer to FIG. 8. FIG. 8 is a schematic diagram of a structure of coupling a splitter 12 at a second output end $D_{o\_2}$ of a splitter 11. It should be noted that, this embodiment of this application is not limited thereto. The splitter may be coupled at the first output end $D_{o\_1}$, or more splitters may be coupled at an output end of the splitter 12. The plurality of cases are not shown in the figure.

In FIG. 8, in addition to the components shown in any embodiment of FIG. 4 to FIG. 7, the communication device 101 further includes a splitter 12 and a third transmit path T3. The third transmit path T3 further includes a third phase shifter and a third power amplifier, which are not shown in FIG. 8. An input end of the splitter 12 is coupled to a second output end $D_{o\_2}$ of the splitter 11, a first output end of the splitter 12 is coupled to an input end of the second transmit path T2, and a second output end of the splitter 12 is coupled to an input end of the third transmit path T3. The first radio frequency signal provided by the first transmit signal transmission channel TS1 to the splitter 11 is processed by the splitter 11 and then separately provided to the input end of the first transmit path T1 and the input end of the splitter 12. The splitter 12 further processes the received signal, and then separately provides the signal to the second transmit path T2 and the third transmit path T3, so as to divide the radio frequency signal provided by one signal transmission channel into a plurality of channels and transmit the radio frequency signal through a plurality of radio frequency paths.

Figure 9:
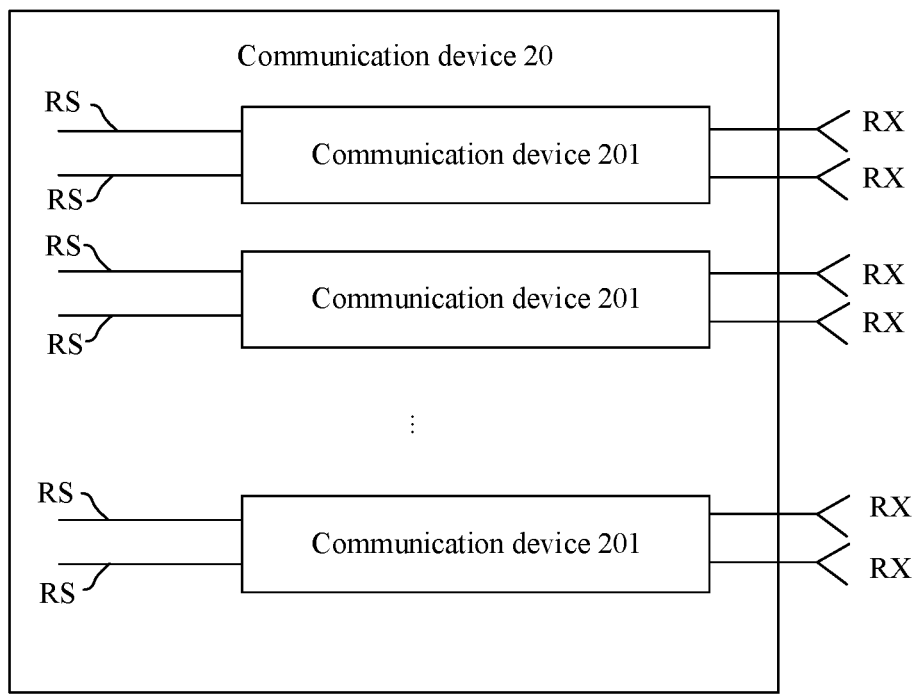
FIG. 9 is a schematic diagram of a structure of a communication device 20 according to an embodiment of this application.

FIG. 9 is a schematic diagram of a structure of the communication device 20 shown in FIG. 1. The communication device 20 includes at least one communication device 201. The communication device 201 may be a communication device 201 shown in any embodiment in FIG. 10 to FIG. 14. In a specific implementation, a plurality of communication devices 201 may be integrated on different chips respectively, or may be integrated on a same chip. Therefore, each communication device 201 may receive a signal in a BF mode or receive a signal in a MIMO mode. In addition, the plurality of communication devices 201 may further jointly receive a signal in the BF mode, or jointly receive a signal in the MIMO mode, or some communication devices 201 receive a signal in the BF mode, and other communication devices 201 receive a signal in the MIMO mode. In addition, an input end of each communication device 201 may be coupled to at least one receive antenna TX, and an output end of each communication device 201 may be coupled to at least one echo signal transmission channel TS. FIG. 9 schematically shows a case in which a communication device 201 is coupled to two echo signal transmission channels TS and coupled to two receive antennas TX. For a specific structure of the echo signal transmission channel RS, refer to related descriptions in FIG. 1. Details are not described herein again.

The following describes in detail the communication device 201 shown in FIG. 9 by using embodiments shown in FIG. 10 to FIG. 14.

Figure 10:
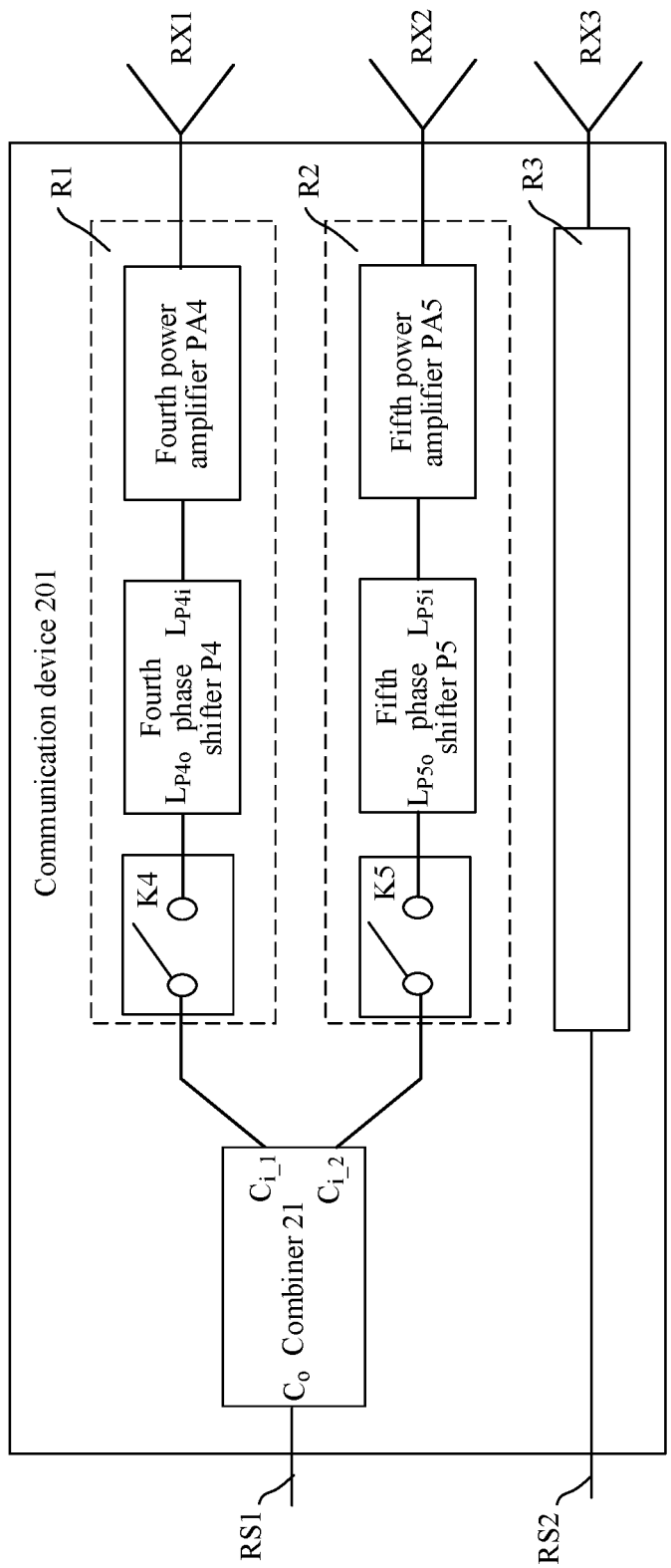
FIG. 10 is a schematic diagram of a structure of a communication device 201 according to an embodiment of this application.

As shown in FIG. 10, the communication device 201 includes a combiner 21, a first receive path R1, and a second receive path R2. The first receive path R1 is coupled to a first receive antenna RX1, and the second receive path R2 is coupled to a second receive antenna RX2. As shown in FIG. 10, the combiner 21 includes a first input end $C_{i\_1}$, a second input end $C_{i\_2}$, and an output end $C_o$. The first input end $C_{i\_1}$ of the combiner 21 is coupled to an output end of the first receive path R1, and the second input end $C_{i\_2}$ of the combiner 21 is coupled to an output end of the second receive path R2. The output end $C_o$ of the combiner 21 is coupled to the first echo signal transmission channel RS1. The first receive path R1 and the second receive path R2 may receive a signal in the MIMO mode, or may receive a signal in the BF mode. The first receive path R1 provides the received first echo signal to the first input end $C_{i\_1}$ of the combiner 21, and the second receive path R2 provides the received second echo signal to the second input end $C_{i\_2}$ of the combiner 21. The combiner 21 processes the received first echo signal and the received second echo signal, and then provides the processed first echo signal and the processed second echo signal to the first echo signal transmission channel RS1.

In this embodiment of this application, the first receive path R1 and the second receive path R2 of the communication device 201 are configured to transmit both a beamforming signal and a MIMO signal, so that the communication device 201 can flexibly configure a signal transmitting manner based on a requirement of a signal receiving and sending scenario. In addition, because both the first receive path R1 and the second receive path R2 can transmit a MIMO signal or a BF signal, it is not necessary to set a receive path dedicated to receiving a BF signal and a receive path dedicated to receiving a MIMO signal. It is also beneficial to reduce a layout area of the communication device 201.

In a specific implementation, the first receive path R1 includes a fourth phase shifter P4 and a fourth power amplifier PA4, and the second receive path R2 includes a fifth phase shifter P5 and a fifth power amplifier PA5. The first input end $C_{i\_1}$ of the combiner 21 is coupled to an output end $L_{P4o}$ of the fourth phase shifter P4, an input end $L_{P4i}$ of the fourth phase shifter P4 is coupled to an output end of the fourth power amplifier PA4, and an input end of the fourth power amplifier PA4 is coupled to a first receive antenna RX1. The second input end $C_{i\_2}$ of the combiner 21 is coupled to an output end $L_{P5o}$ of the fifth phase shifter P5, an input end $L_{P5i}$ of the fifth phase shifter P5 is coupled to an output end of the fifth power amplifier PA5, and an input end of the fifth power amplifier PA5 is coupled to a second receive antenna RX1. It should be noted that, the first receive path R1 and the second receive path R2 may further include more components. For example, the first receive path R1 and the second receive path R2 may further respectively include a filter, where the filter may be coupled between a phase shifter and a power amplifier in each receive path, or may be coupled between an input end of the combiner 21 and a phase shifter.

Further, in this embodiment of this application, the first receive path R1 further includes a fourth switch K4, and the second receive path R2 further includes a fifth switch K5. The fourth switch K4 is coupled between the first input end $C_{i\_1}$ of the combiner 21 and the fourth phase shifter P4, and the second switch K2 is coupled between the second input end $C_{i\_2}$ of the combiner 21 and the fourth phase shifter P4. Therefore, on and off of the first switch K1 and the second switch K2 are controlled, so that the first receive path R1 and the second receive path R2 receive a signal in the MIMO mode or receive a signal in the BF mode. Details are described below.

When the first receive path R1 and the second receive path R2 receive a signal in the BF mode, both the fourth switch K4 and the fifth switch K5 are turned on, and the first input end $C_{i\_1}$ of the combiner 21 and the output end $L_{P4o}$ of the fourth phase shifter P4 form a path. The second input end $C_{i\_2}$ of the combiner 21 and the output end $L_{P5o}$ of the fifth phase shifter P5 form a path. In this case, the fourth power amplifier PA4 receives the first radio frequency signal from the first receive antenna RX1, performs power amplification on the first radio frequency signal, and provides the first radio frequency signal to the fourth phase shifter P4. The fourth phase shifter P4 performs phase shift on the first radio frequency signal and provides the first radio frequency signal to the first input end $C_{i\_1}$ of the combiner 21. The fifth power amplifier PA5 receives the second radio frequency signal from the second receive antenna RX2, performs power amplification on the second radio frequency signal, and provides the second radio frequency signal to the fifth phase shifter P5. The fifth phase shifter P5 performs phase shift on the second radio frequency signal and provides the second radio frequency signal to the second input end $C_{i\_2}$ of the combiner 21. The combiner 21 combines the received first radio frequency signal and the received second radio frequency signal and provides the first radio frequency signal and the second radio frequency signal to the first echo signal transmission channel RS1.

When the first receive path 11 and the second receive path 12 receive a signal in the PM-MIMO mode, two receiving manners may be included.

First receiving manner: Both the fourth switch K4 and the fifth switch K5 are turned on, and the first input end $C_{i\_1}$ of the combiner 21 and the output end $L_{P4o}$ of the fourth phase shifter P4 form a path. The second input end $C_{i\_2}$ of the combiner 21 and the output end $L_{P5o}$ of the fifth phase shifter P5 form a path. In this case, the fourth power amplifier PA4 receives the first radio frequency signal from the first receive antenna RX1, performs power amplification on the first radio frequency signal, and provides the first radio frequency signal to the fourth phase shifter P4. The fourth phase shifter P4 performs phase shift on the first radio frequency signal and provides the first radio frequency signal to the first input end $C_{i\_1}$ of the combiner 21. The fifth power amplifier PA5 receives the second radio frequency signal from the second receive antenna RX2, performs power amplification on the second radio frequency signal, and provides the second radio frequency signal to the fifth phase shifter P5. The fifth phase shifter P5 performs phase shift on the second radio frequency signal and provides the second radio frequency signal to the second input end $C_{i\_2}$ of the combiner 21. The combiner 21 combines the received first radio frequency signal and the received second radio frequency signal and provides the first radio frequency signal and the second radio frequency signal to the first echo signal transmission channel RS1. The first echo signal transmission channel RS1 performs down-conversion processing on the received radio frequency signal and converts it into a digital signal, and then supplies the digital signal to the digital signal processor 30 shown in FIG. 1. Therefore, the digital signal processor 30 may perform PM-MIMO separation processing on the received digital signal.

Second receiving manner: In this receiving manner, the communication device 201 may further be provided with a third receive path R3 independent of the first receive path R1 and the second receive path R2, and the third receive path R3 is directly coupled to the second echo signal transmission channel RS2, as shown in FIG. 10. Therefore, the fourth switch K4 or the fifth switch K5 is turned on, and one of the first receive path R1 or the second receive path R2 provides the first radio frequency signal to the first echo signal transmission channel RS1 by using the combiner 21. The third receive path R3 provides the second radio frequency signal to the second echo signal transmission channel RS2. That is, signals received by a plurality of antennas may simultaneously receive a plurality of radio frequency signals, and the received plurality of radio frequency signals are separately provided to the digital signal processor 30 shown in FIG. 1 through a plurality of independent signal transmission channels. Therefore, the digital signal processor 30 may perform PM-MIMO separation processing on the received digital signal.

When the first receive path 11 and the second receive path 12 receive a signal in the TDM-MIMO mode, the fourth switch K4 and the fifth switch K5 may be turned on and turned off in a time-division manner, so that in the first timeslot, the first input end $C_{i\_1}$ of the combiner 21 and the output end $L_{P4o}$ of the fourth phase shifter P4 form a path, and the second input end $C_{i\_2}$ of the combiner 21 is disconnected from the fifth phase shifter P5. In the second timeslot, a path is formed between the second output end $C_{i\_2}$ of the combiner 21 and the output end $L_{P5o}$ of the fifth phase shifter P5, and the first input end $C_{i\_1}$ of the combiner 21 is disconnected from the fourth phase shifter P4. In addition, to enable the combiner 21 to work normally, a matching load may be disposed between the first input end $C_{i\_1}$ of the combiner 21 and the fourth phase shifter P4, and a matching load may be disposed between the second input end $C_{i\_1}$ of the combiner 21 and the fifth phase shifter P5. Matching loads are not shown in the figures. In this case, in the first timeslot, the combiner 21 receives the first radio frequency signal from the fourth phase shifter P4, and provides the first radio frequency signal to the first echo signal transmission channel RS1. In the second timeslot, the combiner 21 receives the second radio frequency signal from the fifth phase shifter P5, and provides the second radio frequency signal to the first echo signal transmission channel RS1. Therefore, the first echo signal transmission channel RS1 receives the radio frequency signal in a time-division manner, performs down-conversion processing on the received radio frequency signal, converts the radio frequency signal into a digital signal, and provides the digital signal to the digital signal processor 30 shown in FIG. 1. The digital signal processor 30 may perform PM-MIMO separation processing on the received digital signal.

The foregoing describes a schematic diagram of a structure of the communication device 201 when the splitter is provided with two input ends. In a possible implementation, the combiner 21 may further include more output ends such as a third input end and a fourth input end. Correspondingly, the communication device 201 may further include more receive paths, such as a third receive path coupled to the third input end of the combiner 21, and a fourth receive path coupled to the fourth input end of the combiner 21. The third receive path, the fourth receive path, and more receive paths may implement receiving of a signal in a BF mode or receiving of a signal in a MIMO mode. A working principle of receiving a signal in the BF mode and a working principle of receiving a signal in the MIMO mode are described above, and details are not described herein again. In this case, a specific structure of the communication device 201 is shown in FIG. 11.

Figure 11:
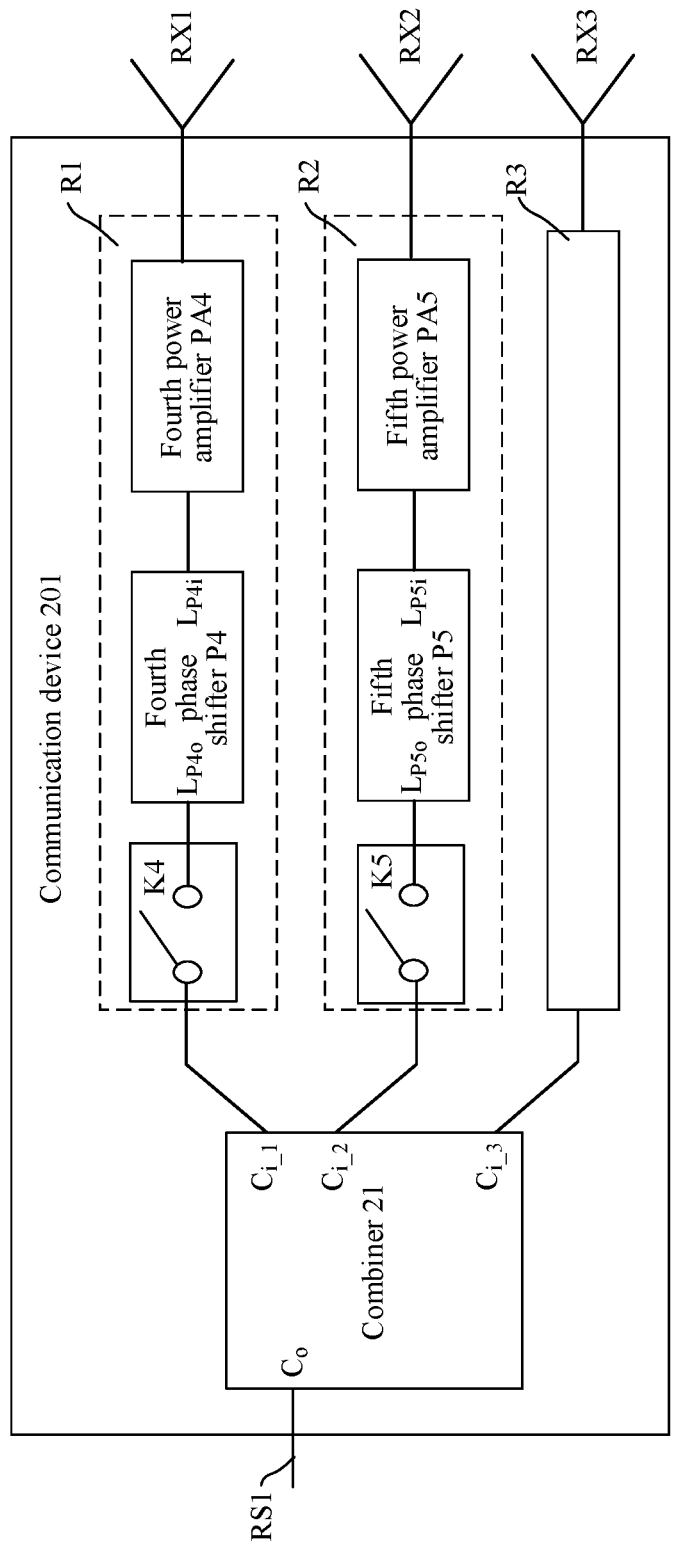
FIG. 11 is still another schematic diagram of a structure of a communication device 201 according to an embodiment of this application.
Figure 12:
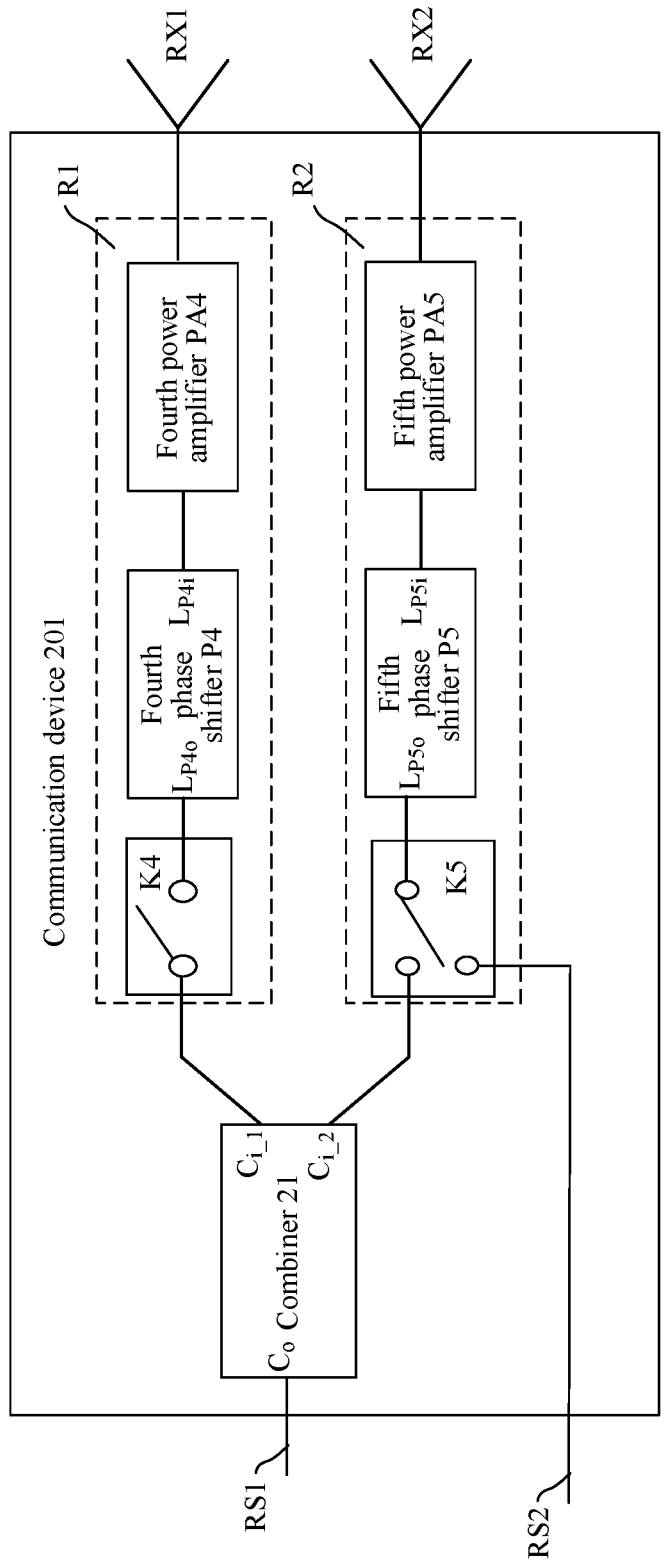
FIG. 12 is still another schematic diagram of a structure of a communication device 201 according to an embodiment of this application.

It can be learned from the embodiment shown in FIG. 11 that in the communication device 201, the first receive path R1 and the second receive path R2 respectively provide the first echo signal and the second echo signal to the combiner 21. The combiner 21 provides the first echo signal and the second echo signal to the first echo signal transmission channel RS1 after combining, or provides the first echo signal and the second echo signal to the first echo signal transmission channel RS1 in a time-division manner. In a possible implementation, the communication device 201 may further directly provide the first echo signal received by the first receive path or the second echo signal received by the second receive path to the second echo signal transmission channel RS2, without passing through the combiner 21. In this case, the fourth switch K4 or the fifth switch K5 may be a multi-input switch. The following uses an example in which the fifth switch K5 is a multi-input switch for description. In this implementation, a coupling relationship between components in the communication device 201 is shown in FIG. 12. In FIG. 12, an output end $C_o$ of the combiner 21 is coupled to a first echo signal transmission channel RS1. The first input end $C_{i\_1}$ and the second input end $C_{i\_2}$ of the combiner 21 are separately coupled to an output end of the fourth switch K4 and a first output end of the fifth switch K5. Different from the structure of the communication device 201 shown in FIG. 11, a second output end of the fifth switch K5 is coupled to the second echo signal transmission channel RS2. Therefore, when the first receive path R1 and the second receive path R2 need to be separately provided to different signal transmission channels, the fourth switch K4 is turned on, and a path is formed between the first input end $C_{i\_1}$ of the combiner 21 and the output end $L_{P4o}$ of the fourth phase shifter P4. The fifth switch K5 controls forming a path between the second echo signal transmission channel RS2 and the output end $L_{P5o}$ of the fifth phase shifter P5. In this case, the fourth power amplifier P4 performs power amplification on the first echo signal received from the first receive antenna RX1 and provides the first echo signal to the fourth phase shifter P4. The fourth phase shifter P4 performs phase shift on the signal provided by the fourth power amplifier PA4 and provides the signal to the first input end $C_{i\_1}$ of the combiner 21, and provides the first echo signal to the first echo signal transmission channel RS1 by using the combiner 21. The fifth power amplifier P5 performs power amplification on the second echo signal received from the second receive antenna RX2 and provides the second echo signal to the fifth phase shifter P5, and the fifth phase shifter P5 performs phase shift on the signal provided by the fifth power amplifier PA5 and provides the signal to the second echo signal transmission channel RS2.

Figure 13:
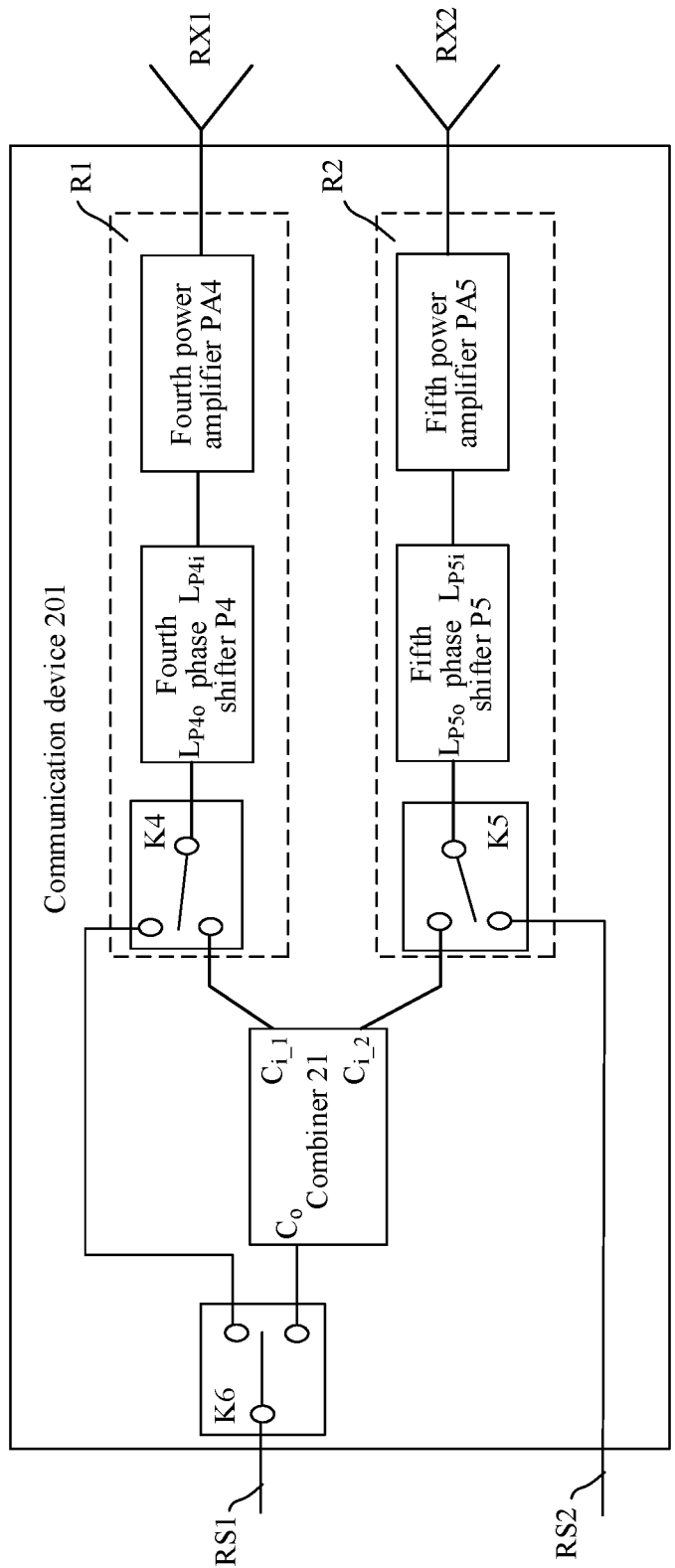
FIG. 13 is still another schematic diagram of a structure of a communication device 201 according to an embodiment of this application.

It can be seen from embodiments shown in FIG. 10 to FIG. 12 that one or more echo signals are all output into one signal by using the combiner 21. In still another possible implementation of this embodiment of this application, when a plurality of echo signals need to be received from a plurality of signal receive paths, and any echo signal does not need to be combined, a combiner may not be required. The echo signals received by the plurality of signal receive paths are directly provided to a plurality of echo signal transmission channels, so as to reduce an echo signal loss. Based on this, FIG. 13 is still another schematic diagram of a structure of a communication device 201 according to an embodiment of this application. In FIG. 13, a combiner 21, a first receive path R1, and a second receive path R2 are included. The first receive path R1 includes a fourth switch K4, a fourth phase shifter P4, and a fourth power amplifier PA4. The second receive path R2 includes a fifth switch K5, a fifth phase shifter P5, and a fifth power amplifier PA5. The fifth switch K5 is a multi-input switch. For a connection relationship between components, refer to related descriptions in FIG. 10 to FIG. 12. Details are not described herein again. Different from the implementations shown in FIG. 10 to FIG. 12, in this implementation, both the fourth switch K4 and the fifth switch K5 are multi-input switches, and in addition, a sixth switch K6 is further included. The sixth switch K6 may be a multi-input switch. The figure schematically shows that the switch K6 is a two-input switch. For a connection relationship between the fifth switch K5 and each component or transmission channel, refer to related descriptions in FIG. 12. A first output end of the fourth switch K4 is coupled to a first input end $C_{i\_1}$ of the combiner 21. A second output end of the fourth switch K4 is coupled to a first input end of the sixth switch K6, a second input end of the sixth switch K6 is coupled to an output end $C_o$ of the combiner 21, and an output end of the sixth switch K6 is coupled to a first echo signal transmission channel RS1. Therefore, the first echo signal transmission channel RS1 is coupled to the output end $L_{P4o}$ of the fourth phase shifter P4 by using the sixth switch K6 and the fourth switch K4, and the fourth phase shifter P4 directly provides the first echo signal to the first echo signal transmission channel RS1.

Figure 14:
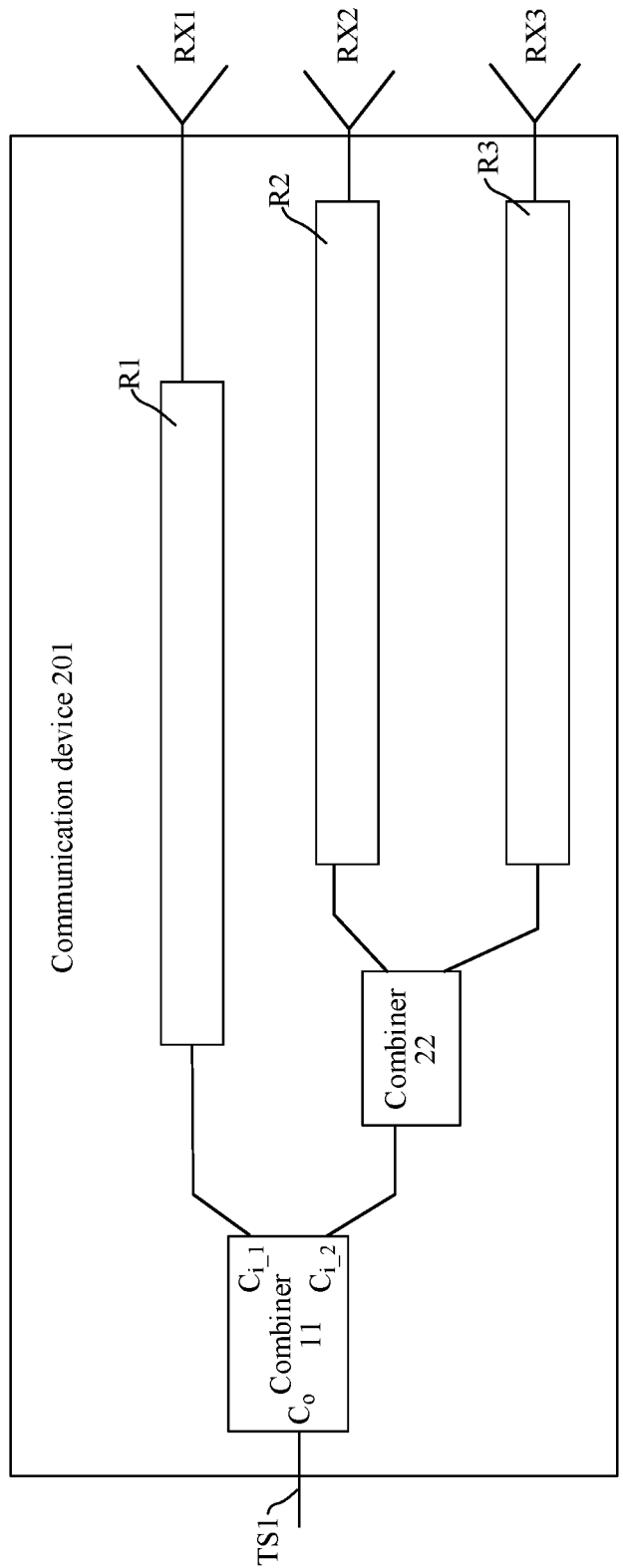
FIG. 14 is still another schematic diagram of a structure of a communication device 201 according to an embodiment of this application.

It can be learned from embodiments shown in FIG. 10 to FIG. 13 that the communication device 201 includes a combiner. In a possible implementation, more combiners may be further disposed on an input side of the combiner 21, so as to combine more echo signals. Refer to FIG. 14. FIG. 14 is a schematic diagram of a structure of coupling a combiner 22 at a second input end $C_{i\_2}$ of a combiner 21. It should be noted that, this embodiment of this application is not limited thereto. The combiner may be coupled at the first input end $C_{i\_1}$, or more combiners may be coupled at the input end of the combiner 22. The plurality of cases are not shown in the figure.

In FIG. 14, in addition to the components shown in any embodiment of FIG. 10 to FIG. 13, the communication device 201 further includes a combiner 22 and a third receive path R3. The third receive path R3 further includes a sixth phase shifter and a sixth power amplifier, which are not shown in FIG. 16. An output end of the combiner 22 is coupled to a second input end $C_{i\_2}$ of the combiner 21, a first input end of the combiner 22 is coupled to an output end of the second receive path R2, and a second input end of the combiner 22 is coupled to an output end of the third receive path R3. The third echo signal received by the third receive path R3 and the second echo signal received by the second receive path R2 are provided to the combiner 22, and are provided to the combiner 21 after being processed by the combiner 22. The combiner 21 further processes the signal provided by the combiner 22 and the first echo signal provided by the first receive path R1, and then provides the signals to the first echo signal transmission channel RS1, so that echo signals received by a plurality of receive paths are combined into one signal to one signal transmission channel.

Figure 15:
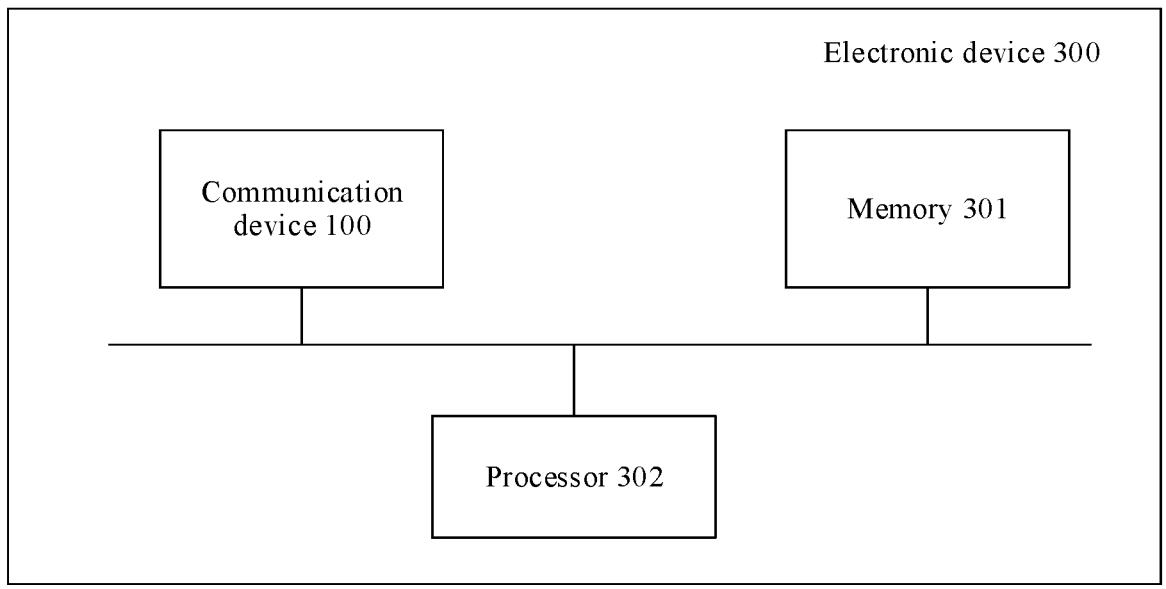
FIG. 15 is a schematic diagram of a structure of an electronic device 300 according to an embodiment of this application.

An embodiment of this application further provides an electronic device 300. Refer to FIG. 15. The electronic device 300 may include a communication device 100, a memory 301, and a processor 302. For detailed descriptions of the communication device 100 herein, refer to related descriptions in embodiments shown in FIG. 1 to FIG. 14. Details are not described herein again. It should be understood that the electronic device 300 herein may be a terminal device, and the terminal device may be a transport vehicle or an intelligent device. For example, the terminal device may be a smart home device, an intelligent wearable device, an unmanned aerial vehicle, a self-driving vehicle, a robot, or the like. The terminal device may include a radar device, and the radar device may receive and transmit a radar signal. The radar signal may be a BF signal or a MIMO signal. The radar signal is usually a millimeter wave signal, and the operating frequency band of the radar signal is usually within the range (76 GHz-81 GHz).

Figure 16:
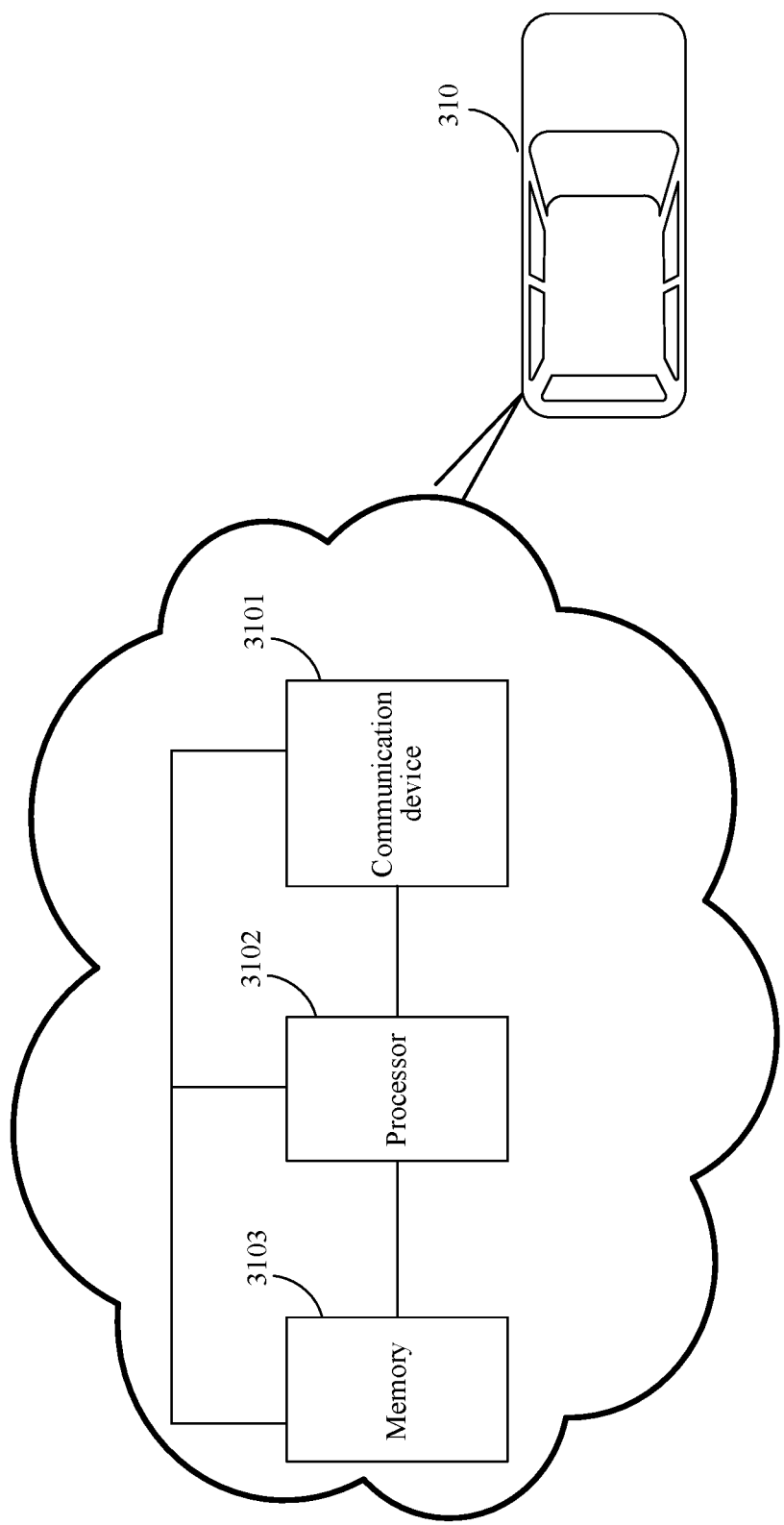
FIG. 16 is a schematic diagram of a self-driving vehicle according to an embodiment of this application.

The terminal device is an example in which a self-driving vehicle 310 shown in FIG. 16 is used. The terminal device may specifically include a processor 3102, a memory 3103, a communication device 3101, an antenna, and an input/output apparatus. The processor 3102 is mainly configured to process a communication protocol and communication data, control the entire self-driving vehicle 310, execute a software program, and process data of the software program, for example, control the communication device 100 to receive and transmit a BF signal or a MIMO signal. The memory 3103 is mainly configured to store a software program and data. The communication device 100 is mainly configured to perform conversion between a baseband signal and a radio frequency signal, and process the radio frequency signal. The communication device 100 is mainly configured to receive and transmit a radio frequency signal in a form of an electromagnetic wave based on control of the processor 3102, to implement a scenario such as ranging, speed measurement, or positioning. The input/output apparatus such as a touchscreen or a display screen is mainly configured to receive data input by a user and output data to the user.

After the self-driving vehicle 310 is started, the processor 3102 may read the software program in the memory 3103, interpret and execute instructions of the software program, and process the data of the software program. When a radio signal needs to be transmitted, the processor 3102 controls the communication device 100 to process the to-be-sent signal and transmit the signal in a form of an electromagnetic wave by using an antenna. In addition, the processor 3102 may further control the communication device 100 to receive the echo signal by using the antenna, and the communication device 100 generates target information based on the transmit signal and the echo signal. The processor 3102 controls, based on the target information, the self-driving vehicle 310 to perform a next action. The foregoing target information may advantageously include but is not limited to information about a distance from an obstacle, information about a current speed of an unmanned vehicle, or the like.

A person skilled in the art may understand that, for ease of description, FIG. 16 shows only one memory and one processor. In an actual self-driving vehicle, there may be a plurality of processors and a plurality of memories. The memory may also be referred to as a storage medium, a storage device, or the like. It should be noted that, a type of the memory is not limited in embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication device, comprising:
   a first splitter;
   a first transmit path, comprising a first phase shifter and a first power amplifier; and
   a second transmit path comprising a second phase shifter and a second power amplifier;
   wherein an output end of the first transmit path is coupled to a first transmit antenna, and an output end of the second transmit path is coupled to a second transmit antenna;
   wherein an input end of the first transmit path and an input end of the second transmit path are separately coupled to the first splitter;
   wherein the first transmit path is further configured to transmit a first signal, and the second transmit path is further configured to transmit a second signal, and wherein the first signal and the second signal are time-division multiplexing multiple-input-multiple-output (MIMO) signals; and
   wherein the first transmit path is further configured to transmit a third signal, and the second transmit path is further configured to transmit a fourth signal, and wherein the third signal and the fourth signal are beamforming signals.

2. The communication device according to claim 1, wherein the first transmit path is further configured to transmit a fifth signal, and the second transmit path is further configured to transmit a sixth signal;
   wherein the fifth signal and the sixth signal are phase-modulated MIMO signals; and wherein a phase of at least one of the fifth signal and the sixth signal varies with time.

3. The communication device according to claim 1,
   wherein a phase difference between the third signal and the fourth signal is set based on a phase difference between the first phase shifter and the second phase shifter.

4. The communication device according to claim 1, wherein the first transmit path further comprises a first switch, and the second transmit path further comprises a second switch;
   wherein a first input end of the first switch is coupled to a first output end of the first splitter, and an output end of the first switch is coupled to the input end of the first transmit path; and
   wherein a first input end of the second switch is coupled to a second output end of the first splitter, and an output end of the second switch is coupled to the input end of the second transmit path.

5. The communication device according to claim 4, wherein the communication device further comprises a third switch and a first transmit signal transmission channel; and
   wherein an input end of the third switch is coupled to the first transmit signal transmission channel, a first output end of the third switch is coupled to an input end of the first splitter, and a second output end of the third switch is coupled to a second input end of the first switch.

6. The communication device according to claim 5, wherein the first transmit signal transmission channel comprises a first frequency mixer, and the first frequency mixer is configured to:
   receive a first analog signal; and
   perform one of:
      perform up-conversion processing on the first analog signal, to obtain an up-converted first analog signal, and provide the up-converted first analog signal to the input end of the first splitter; or
      provide the first analog signal to the first transmit path.

7. The communication device according to claim 6, wherein the first transmit signal transmission channel further comprises:
   a first digital-to-analog converter, configured to:
   receive a first digital signal; and convert the first digital signal into the first analog signal.

8. The communication device according to claim 4, wherein the communication device further comprises a second transmit signal transmission channel; and
a second input end of the second switch is coupled to the second transmit signal transmission channel.

9. The communication device according to claim 8, wherein the second transmit signal transmission channel comprises a second frequency mixer; and
wherein the second frequency mixer is configured to:
receive a second analog signal;
perform up-conversion processing on the second analog signal, to obtain an up-converted second analog signal; and
provide the up-converted second analog signal to the second transmit path.

10. The communication device according to claim 9, wherein the second transmit signal transmission channel further comprises a second digital-to-analog converter; and
wherein the second digital-to-analog converter is configured to:
receive a second digital signal; and
convert the second digital signal into the second analog signal.

11. The communication device according to claim 1, further comprising:
a second splitter; and
a third transmit path, comprising a third phase shifter and a third power amplifier;
wherein an input end of the second splitter is coupled to a second output end of the first splitter;
wherein a first output end of the second splitter is coupled to the input end of the second transmit path, and a second output end of the second splitter is coupled to an input end of the third transmit path;
wherein the first transmit path, the second transmit path, and the third transmit path are each configured to transmit a beamforming signal; and
wherein the first transmit path, the second transmit path, and the third transmit path are each further configured to transmit a MIMO signal.

12. The communication device according to claim 1, further comprising:
a first receive path, comprising a fourth phase shifter and a fourth power amplifier;
a second receive path, comprising a fifth phase shifter and a fifth power amplifier; and
a combiner;
wherein an input end of the first receive path is coupled to a first receive antenna, and an input end of the second receive path is coupled to a second receive antenna;
wherein an output end of the first receive path and an output end of the second receive path are separately coupled to the combiner;
wherein the first receive path and the second receive path are each configured to receive a beamforming signal; and
wherein the first receive path and the second receive path are each further configured to receive a multiple-input-multiple-output (MIMO) signal.

13. The communication device according to claim 12, further comprising:
a digital signal processor, configured to perform MIMO processing on signals received by the first receive path and the second receive path.

14. The communication device according to claim 12, wherein the communication device is configured to:
obtain a local oscillator signal, and provide the local oscillator signal to each of a first frequency mixer, a second frequency mixer, a third frequency mixer, and a fourth frequency mixer; and
wherein the first frequency mixer is coupled to the first transmit path, the second frequency mixer is coupled to the second transmit path, the third frequency mixer is coupled to the first receive path, and the fourth frequency mixer is coupled to the second receive path.

15. The communication device according to claim 14, further comprising a local oscillator, a fourth switch, a local oscillator signal input end, and a local oscillator signal output end;
wherein a first input end of the fourth switch is coupled to the local oscillator signal input end, and a second input end of the fourth switch is coupled to a first output end of the local oscillator, and an output end of the fourth switch is coupled to each of the first frequency mixer, the second frequency mixer, the third frequency mixer, and the fourth frequency mixer;
wherein a second output end of the local oscillator is coupled to the local oscillator signal output end; and
wherein the fourth switch turns on, based on control of a controller, the local oscillator to obtain the local oscillator signal from the local oscillator, or turns on the local oscillator signal input end to input the local oscillator signal from the local oscillator signal input end.

16. An electronic device, comprising:
a transceiver chip, comprising a communication device, the communication device comprising a first splitter, a first transmit path, and a second transmit path, wherein:
the first transmit path comprises a first phase shifter and a first power amplifier, and the second transmit path comprises a second phase shifter and a second power amplifier;
an output end of the first transmit path is coupled to a first transmit antenna, and an output end of the second transmit path is coupled to a second transmit antenna;
an input end of the first transmit path and an input end of the second transmit path are separately coupled to the first splitter;
the first transmit path is configured to transmit a first signal, and the second transmit path is configured to transmit a second signal, and the first signal and the second signal are time-division multiplexing multiple-input-multiple-output (MIMO) signals; and
the first transmit path is further configured to transmit a third signal, and the second transmit path is configured to transmit a fourth signal, and the third signal and the fourth signal are beamforming signals.

17. The electronic device according to claim 16, further comprising a digital processor chip.

18. The electronic device according to claim 17, wherein the electronic device further comprises a circuit board, and the transceiver chip and the digital processor chip are disposed on the circuit board.

19. A radar device, comprising an electronic device, the electronic device comprising:
a transceiver chip, comprising a communication device, the communication device comprising a first splitter, a first transmit path, and a second transmit path, wherein:

the first transmit path comprises a first phase shifter and a first power amplifier, and the second transmit path comprises a second phase shifter and a second power amplifier;

an output end of the first transmit path is coupled to a first transmit antenna, and an output end of the second transmit path is coupled to a second transmit antenna;

an input end of the first transmit path and an input end of the second transmit path are separately coupled to the first splitter;

the first transmit path is configured to transmit a first signal, and the second transmit path is configured to transmit a second signal, and the first signal and the second signal are time-division multiplexing MIMO signals; and the first transmit path is further configured to transmit a third signal, and the second transmit path is further configured to transmit a fourth signal, and the third signal and the fourth signal are beamforming signals.

20. The radar device according to claim 19, wherein the radar device is configured to transmit a millimeter wave signal. an operating frequency band of the millimeter wave signal is within a range of 76 GHz to 81 GHz.

\* \* \* \* \*